US012246395B2

(12) United States Patent
Rife

(10) Patent No.: US 12,246,395 B2
(45) Date of Patent: Mar. 11, 2025

(54) ROTARY LASER ENGRAVING DEVICE

(71) Applicant: Jason Earl Rife, Jacksonville, FL (US)

(72) Inventor: Jason Earl Rife, Jacksonville, FL (US)

(73) Assignee: JER CUSTOM DESIGNS, INC., Jacksonville, FL (US)

( * ) Notice: Subject to any disclaimer, the term of this patent is extended or adjusted under 35 U.S.C. 154(b) by 12 days.

(21) Appl. No.: 18/382,053

(22) Filed: Oct. 19, 2023

(65) Prior Publication Data

US 2024/0042547 A1 Feb. 8, 2024

Related U.S. Application Data

(63) Continuation-in-part of application No. 18/242,170, filed on Sep. 5, 2023, now Pat. No. 12,090,572, which
(Continued)

(51) Int. Cl.
*B23K 26/08* (2014.01)
*B23K 26/362* (2014.01)
(Continued)

(52) U.S. Cl.
CPC ........ *B23K 26/0823* (2013.01); *B23K 26/362* (2013.01); *B44B 3/04* (2013.01); *B44B 3/065* (2013.01); *B44B 2700/025* (2013.01)

(58) Field of Classification Search
CPC .... B23K 26/0823; B23K 26/362; B44B 3/04; B44B 3/065; B44B 2700/025
(Continued)

(56) References Cited

U.S. PATENT DOCUMENTS 3,110,966 A 11/1963 Hillig
3,789,732 A 2/1974 Levine
(Continued)

FOREIGN PATENT DOCUMENTS

CN 1188048 A 7/1998
GB 2370250 A 6/2002

OTHER PUBLICATIONS

Piburn Laser Rotary Attachement User Manual (Year: 2019).*
(Continued)

*Primary Examiner* — Dana Ross
*Assistant Examiner* — Joseph W Iskra
(74) *Attorney, Agent, or Firm* — Lippes Mathias LLP; Mitchell Ghaneie; Josephine Chen

(57) ABSTRACT

A rotary laser engraving device for retaining and rotating an object for engraving includes a frame, a first support assembly and a second support assembly mounted on the frame. To support the object the first support assembly includes a set of driven rollers and the second support assembly includes a set of free rollers, each being diagonally offset from the frame. The second support assembly is configured to slidably move on the frame to vary a longitudinal separation between the driven rollers and the free rollers. The second support assembly further includes a vertical adjustment assembly configured to move the free rollers vertically to vary a vertical separation between the driven rollers and the free rollers. In some aspects, the first support assembly also includes a fixed vertical adjustment assembly configured to move the driven rollers vertically to vary a vertical separation between the driven rollers and the free rollers.

19 Claims, 28 Drawing Sheets

Related U.S. Application Data is a continuation of application No. 17/348,446, filed on Jun. 15, 2021.

(60) Provisional application No. 63/039,019, filed on Jun. 15, 2020.

(51) Int. Cl.
  B44B 3/04 (2006.01)
  B44B 3/06 (2006.01)

(58) Field of Classification Search
  USPC .................................................. 219/121.82
  See application file for complete search history.

(56) References Cited

U.S. PATENT DOCUMENTS

| | | |
|---|---|---|
| 3,894,475 A | 7/1975 | Varga |
| 5,224,716 A | 7/1993 | Saeda et al. |
| 5,262,612 A | 11/1993 | Momany et al. |
| 6,984,803 B1 | 1/2006 | Garnier et al. |
| 7,726,220 B2 | 6/2010 | Masters et al. |
| 8,253,065 B2 | 8/2012 | Zhang et al. |
| 9,266,193 B2 | 2/2016 | Liu et al. |
| 9,492,892 B2 | 11/2016 | Liu et al. |
| 9,902,019 B2 | 2/2018 | Schwartz |
| 2002/0119399 A1 | 8/2002 | Leskanic |
| 2006/0096473 A1 | 5/2006 | Beisswenger et al. |
| 2016/0158888 A1 | 6/2016 | Liu et al. |
| 2019/0118290 A1 | 4/2019 | Li |
| 2021/0121985 A1* | 4/2021 | Rubens .............. B23K 37/0538 |

OTHER PUBLICATIONS

"Piburn Laser Rotary Attachment", User manual, Apr. 16, 2019, https://www.lensdigital.com/home/piburn-support/.

"The story of PiBurn", https://www.lensdigital.com/home/the-story-of-piburn/.

* cited by examiner

ROTARY LASER ENGRAVING DEVICE

CROSS-REFERENCE TO RELATED APPLICATIONS

This application is a continuation-in-part of U.S. patent application Ser. No. 18/242,170, filed on Sep. 5, 2023, which is a continuation of U.S. patent application Ser. No. 17/348,446, filed on Jun. 15, 2021, which claims the benefit of the filing date under 35 U.S.C. § 119(e) of Provisional Patent Application Ser. No. 63/039,019 filed on Jun. 15, 2020, each of which is hereby incorporated by reference in its entirety.

FIELD OF THE INVENTION

The subject matter disclosed herein relates generally to rotary laser engraving devices, and more particularly, to rotary laser engraving devices having a multitude of adjustments to rotate and adjustably support various shapes and sizes of objects to be engraved during a laser engraving procedure.

BACKGROUND

It is often desirable to engrave many different objects with various logos, images, etc. For example, it is often desirable to engrave promotional items with a company's name or logo for presentation to customers. Other items, such as souvenirs, toys, and the like, can also benefit from engraving of information or indicia indicating the items origin or purpose.

Laser engraving is a cost-effective way of engraving these types of items. Often it is necessary to move or rotate the object as it is being engraved by a laser machine to gain the desired coverage on the object. Devices are known to rotate the objects as they are engraved, but many such devices do not have the capacity to easily accommodate objects of varying lengths, often requiring bolting and unbolting of support members when changing between differing objects to be engraved. This is a time consuming and costly process, often reducing the numbers of items that can be easily engraved.

Additionally, many objects to be engraved have irregular shapes or varying diameters along their lengths, requiring differing end supports to properly position the objects on the engraving devices. This too requires costly and time-consuming adjustments to the engraving devices to change from one object to be engraved to another.

Further, there are applications and laser machines with smaller heads which are better suited to utilizing a support device with low-profile vertical height adjustment assemblies. In such cases, use of low-profile vertical adjustment assemblies allows proper positioning of objects in the engraving devices while providing extra clearance against possible interference with the laser head or gantry above.

Accordingly, there is a need for a solution to at least one of the aforementioned problems. For instance, there is an established need for rotary laser engraving device that is easily adjustable to accommodate various lengths of objects to be engraved. There is a further need for a laser engraving device that is easily adjustable to accommodate objects having various shapes and/or varying diameters. There is also need for a laser engraving device utilizing low-profile vertical adjustment assemblies. There is still further a need for a rotary laser engraving devices that can accommodate all of these adjustments easily and with a minimal amount of effort on the part of the user.

SUMMARY OF THE INVENTION

A rotary laser engraving device for supporting and rotating an object to be engraved during a laser engraving process is described. The rotary laser engraving device includes a support frame, hereinafter referred to as the "frame," which includes a central bar arranged in a longitudinal direction, a first transverse bar and a second transverse bar arranged in a spaced-apart relationship and coupled to the central bar.

In one embodiment a first support assembly is mounted to the frame for supporting a first end of the object to be engraved. The first support assembly includes a set of driven rollers engaged with a motor assembly to rotate the object to be engraved and one or more retention features configured to retain the object to be engraved. The device includes a second support assembly slidably mounted to the central bar and including a set of free rollers for supporting a second end of the object to be engraved. The set of driven rollers and the set of free rollers are offset diagonally from the central bar of the frame. The second support assembly further includes a glide plate carried by the frame and configured to slidably move the second support assembly in the longitudinal direction along the central bar to vary a longitudinal separation between the set of driven rollers and the set of free rollers. The second support assembly further includes a vertical adjustment assembly and a mounting bracket. The mounting bracket is coupled in-between the glide plate and the vertical adjustment assembly. The vertical adjustment assembly is coupled to the set of free rollers and is carried by the central bar of the frame. The vertical adjustment assembly is configured to move the set of free rollers in the vertical direction to vary a vertical separation between the set of driven rollers and the set of free rollers.

In another embodiment a first support assembly is mounted to the frame for supporting a first end of the object to be engraved. The first support assembly includes a set of driven rollers engaged with a motor assembly to rotate the object to be engraved and one or more retention features configured to retain the object to be engraved. The first support assembly further includes a fixed vertical adjustment assembly coupled to the frame. The fixed vertical adjustment assembly is coupled to the set of driven rollers. The device includes a second support assembly slidably mounted to the central bar and including a set of free rollers for supporting a second end of the object to be engraved. The fixed vertical adjustment assembly is configured to move the driven rollers in the vertical direction to vary a vertical separation between the set of driven rollers and the set of free rollers The set of driven rollers and the set of free rollers are offset diagonally from the central bar of the frame. The second support assembly further includes a glide plate carried by the frame and configured to slidably move the second support assembly in the longitudinal direction along the central bar to vary a longitudinal separation between the set of driven rollers and the set of free rollers. The second support assembly further includes a vertical adjustment assembly and a mounting bracket. The mounting bracket is coupled in-between the glide plate and the vertical adjustment assembly. The vertical adjustment assembly is coupled to the set of free rollers and is carried by the central bar of the frame. The vertical adjustment assembly is configured to move the set of free rollers in the vertical direction to vary a vertical separation between the set of driven rollers and the set of free rollers.

These and other objects, features, and advantages of the device will become more readily apparent from the attached drawings and the detailed description of the preferred embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

NUMBER REFERENCES

Figure 1:
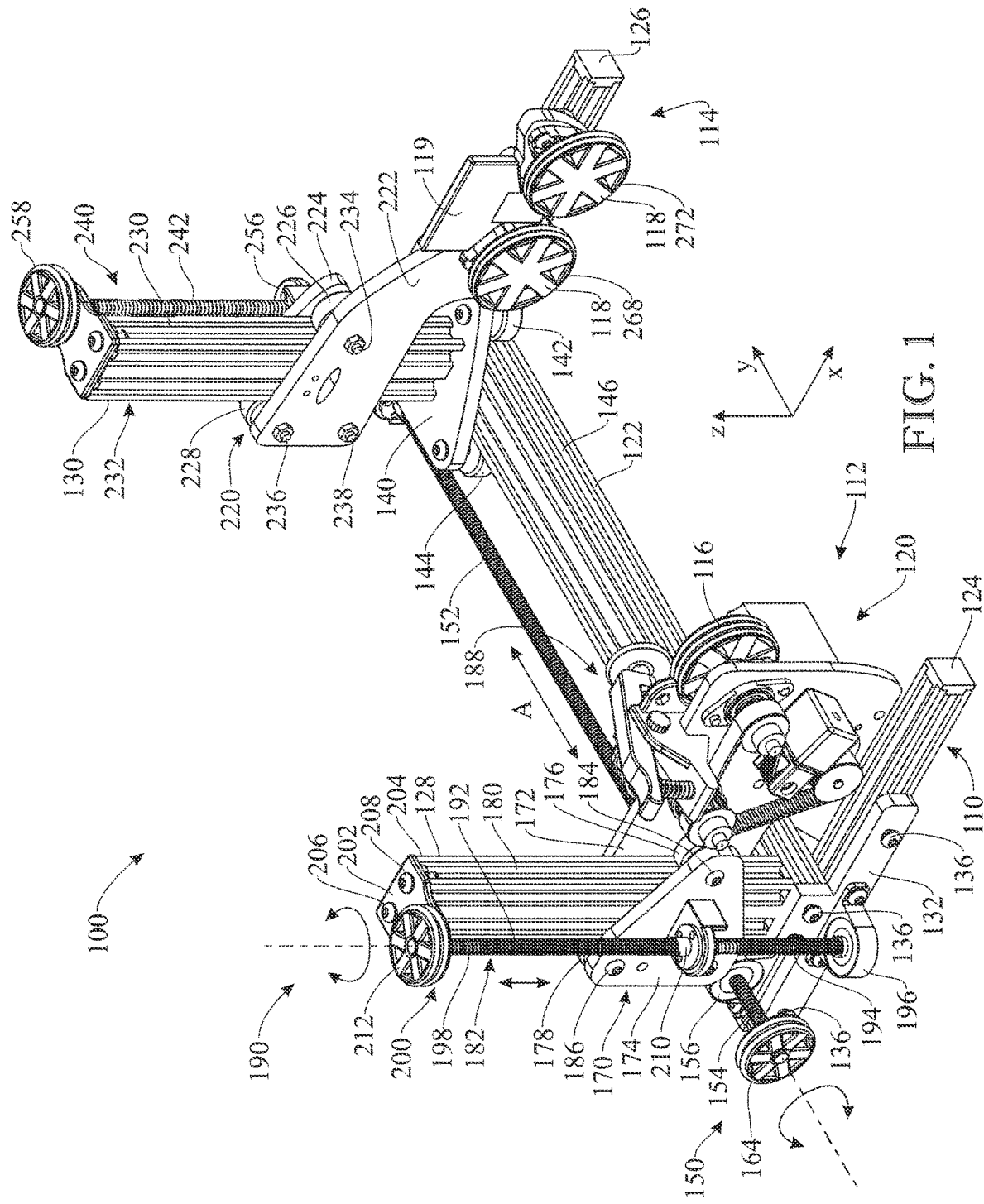
FIG. 1 presents a top, front isometric view of a rotary laser engraving device in accordance with an illustrative first embodiment, the device including a frame, a first support assembly for rotatably supporting a first end of an object to be engraved and a second support assembly for rotatably supporting a second end of the object to be engraved, the second support assembly being vertically and horizontally movable relative to the first support assembly.

100—rotary laser engraving device (first embodiment)
110—frame assembly
112—first support assembly
114—second support assembly
116—driven rollers
118—free rollers
120—motor assembly
122—central rail/bar
124—first transverse bar
126—second transverse bar
128—first/stationary support post
130—second/movable support post
132—first anchor plate
134—second anchor plate
136—Bolt
138—Bolt
140—glide plate
142—wheel
144—wheel
146—track
148—track
150—adjustment mechanism
152—screw
154—first end
156—pillow block bearing
158—second end
160—pillow block bearing
162—nut/drive collar
164—first adjustment wheel/knob
166—Bolt 168—Bolt
170—first bracket
172—inner plate
174—outer plate
176—roller
178—roller
180—track
182—track
184—axle
186—axle
188—clamp
190—first vertical adjustment mechanism
192—first vertical lead screw
194—first/lower end
196—pillow block bearing
198—second end
200—pillow block bearing
202—top plate
204—top end
206—Bolt
208—White Bolt
210—Nut/Drive collar
212—second adjustment wheel or knob
220—second bracket
222—inner plate
224—outer plate
226—roller
228—roller
230—track
232—track
234—Axle
236—Axle
238—third axle
240—second vertical adjustment mechanism
242—second vertical lead screw
244—first end
246—pillow block bearing
250—pillow block bearing
252—top plate
254—top end
256—nut/drive collar
258—third adjustment wheel or knob
260—inner driven roller
262—inner axle
264—outer driven roller
266—outer axle
268—inner free roller
270—inner axle
272—outer free roller
274—outer axle
276—pillow block bearings
278—pillow block bearings
280—pillow block bearing
282—pillow block bearing
284—frame mount
286—top clamp
288—pivot pin
290—spring
292—first end
294—first end
296—clamp wheel
300—motor
302—drive belt
304—motor drive pulley
306—drive axle
308—first cog pulley
310—second cog pulley
312—mounting brackets
314—mounting brackets
316—tensioner
320—third roller
322—axle
400—cup
402—first/open end
404—second/closed end
406—inner surface
408—outer surface
410—tumbler
500—laser
600—rotary laser engraving device (second embodiment)
602—drive belt
604—idler pulley
606—upper portion
610—frame assembly
612—first support assembly
614—second support assembly
616—driven rollers
618—free rollers
620—motor assembly
622—central rail/bar
624—first transverse bar
626—second transverse bar
632—first anchor plate
634—second anchor plate
636—rear wheel stop
638—mounting bracket
640—glide plate
642—wheel
644—wheel
646—track
648—track
650—position adjustment knob
652—track
660—base
662—bumper
664—stop knob
668—spring
670—tab
672—receptacle
674—bracket
676—wheel
678—stem
688—head clamp
700—vertical adjustment assembly
702—wheel mount bracket
704—lead screw assembly
706—scissor link assembly
708—actuator
710—base frame
712—head frame
714—first head guideway
716—second head guideway
718—head plates
720—center brace bar
722—center cross brace
724—first base guideway
726—second base guideway
728—front base plate
730—interior mount
732—head top member
734—head bottom member
736—base top member
738—base bottom member
740—stop cutouts 742—primary lead screw
744—first end
746—second end
748—aperture
750—rear bushing bearing
752—screw bracket
754—front bushing bearing
756—nut/drive collar
758—adjustment wheel
760—front bracket
762—main pulley
764—transfer pulley
766—transfer belt
768—link sets
770—first end
772—second end
774—guide bearings
776—link head mount
778—link base mount
780—central brace
782—exterior bar
784—interior bar
800—rotary laser engraving device (third embodiment)
802—drive belt
806—upper portion
810—frame assembly
812—first support assembly
816—driven rollers
820—motor assembly
832—first anchor plate
884—motor support bracket
888—head clamp
890—motor mount plate
892—extension plate
900—fixed vertical adjustment assembly
902—wheel mount bracket
904—lead screw assembly
906—scissor link assembly
908—actuator
910—base frame
912—head frame
914—first head guideway
916—second head guideway
918—head plates
920—center brace bar
922—center cross brace
924—first base guideway
926—second base guideway
928—front base plate
929—rear base plate
930—interior mount
932—head top member
934—head bottom member
936—base top member
938—base bottom member
940—stop cutouts
942—primary lead screw
944—first end
946—second end
948—aperture
950—rear bushing bearing
952—screw bracket
954—front bushing bearing
956—nut/drive collar
958—adjustment wheel
960—front bracket
962—main pulley
964—transfer pulley
966—transfer belt
968—link sets
970—first end
972—second end
974—guide bearings
976—link head mount
978—link base mount
980—central brace
982—exterior bar
984—interior bar

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the device as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The following embodiments are directed toward rotary laser engraving devices having horizontal and vertically adjustable supports to accommodate various sizes and shapes of objects to be engraved.

Figure 2:
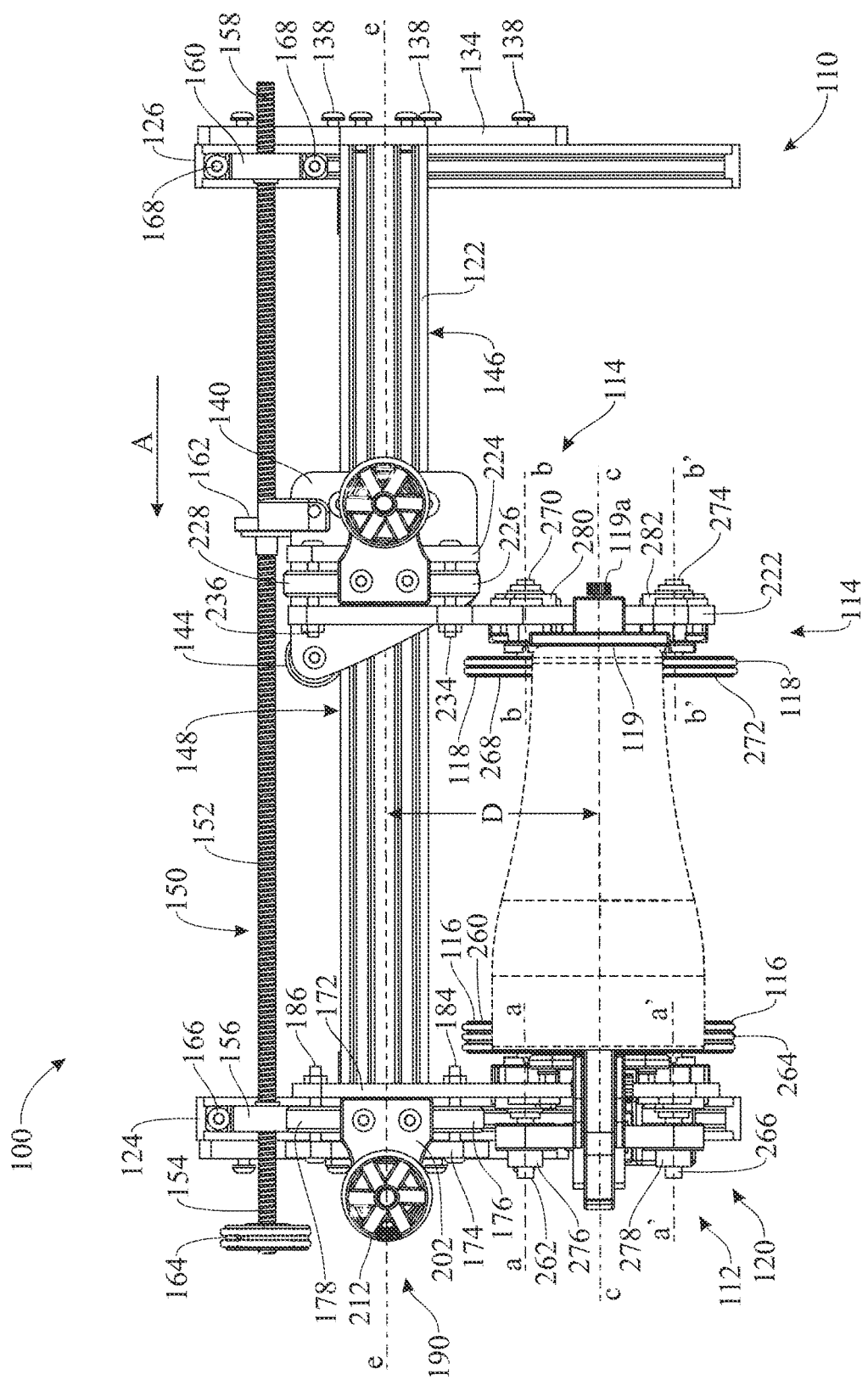
FIG. 2 presents a top plan view of the rotary laser engraving device of FIG. 1, with the object to be engraved fully supported on the first and second support assemblies.

Referring initially to FIGS. 1 and 2, a rotary laser engraving device 100 is illustrated in accordance with an exemplary first embodiment. The rotary laser engraving device 100 generally includes a frame assembly 110, a first support assembly 112 movably mounted on the frame assembly 110 and a second support assembly 114 movably mounted on the frame assembly 110. The first support assembly 112 is movable relative to the frame assembly 110 in a vertical direction z. The second support assembly 114 is both movable relative to the frame assembly 110 in the vertical direction z and in a horizontal, longitudinal direction y perpendicular to the vertical direction z, to accommodate varying lengths of objects to be engraved. The first support assembly 112 and the second support assembly 114 are off-centered from the frame assembly 110. More details are described hereinbelow.

Figure 6:
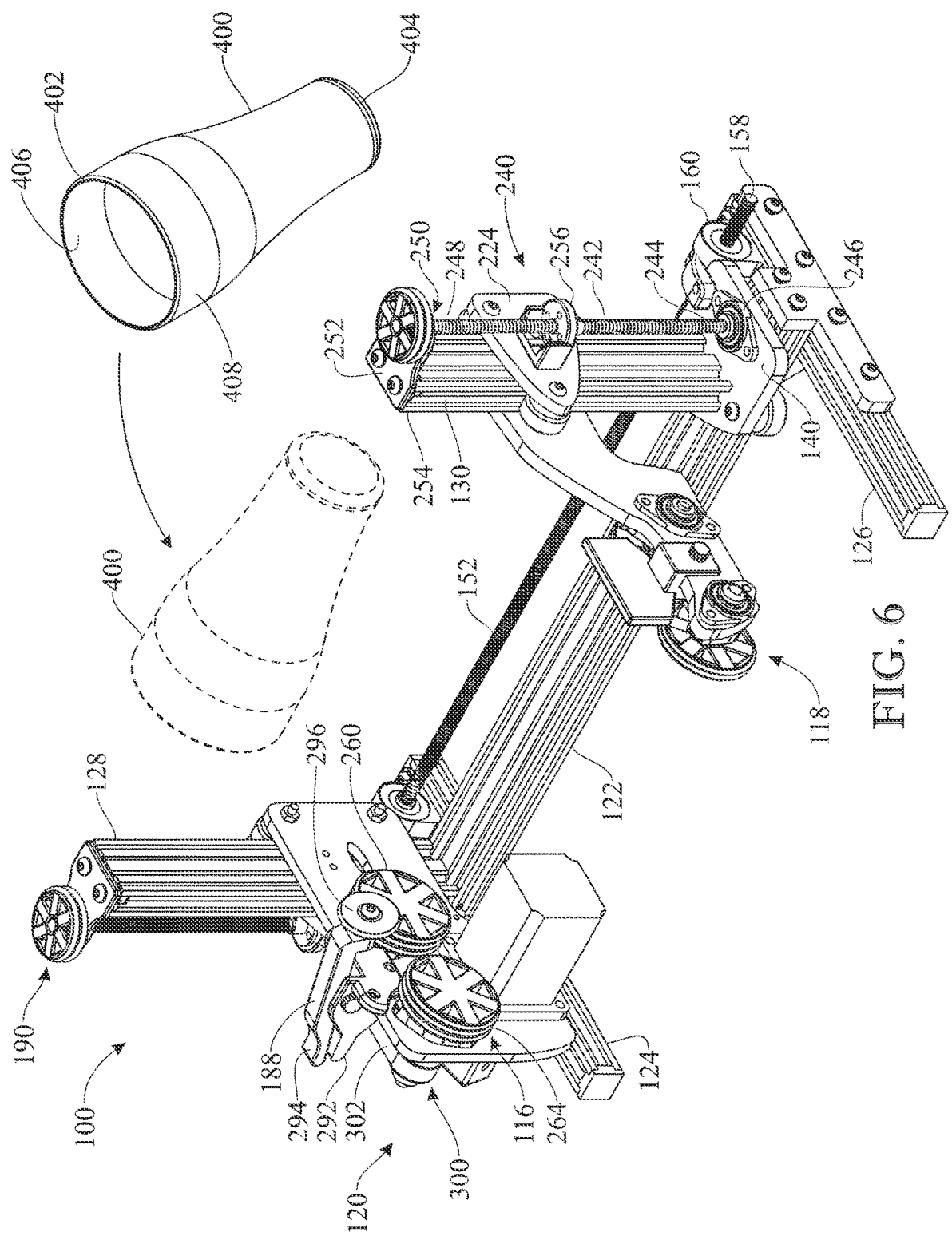
FIG. 6 presents a top, front isometric view of the rotary laser engraving device of FIG. 1, with an object to be engraved being initially inserted towards the first support assembly.

As shown in FIGS. 1 and 6, the first support assembly 112 includes a set of driven rollers 116 for supporting and rotating a first end of an object to be engraved, while the second support assembly 114 includes a set of free rollers 118 to allow the object to be engraved to rotate freely relative to the second support assembly. A motor assembly 120 is provided to rotate the set of driven rollers 116 of the first support assembly 112 and thus rotate the object to be engraved as it is being engraved by an associated laser mechanism (not shown).

In order to support the first and second support assemblies 112 and 114, respectively, the frame assembly generally includes a central rail or bar 122, which may be arranged in the longitudinal direction y. The central bar 122 may be affixed to a first transverse bar 124 and a second transverse bar 126. The first and second transverse bars 124 and 126 may extend in a horizontal, transverse direction x that is perpendicular to the longitudinal direction y and vertical direction z. The first and second transverse bars 124 and 126 may stabilize the central bar 122, and thus the entire rotary laser engraving device 100, during operation of the motor assembly 120 and the engraving process. A first or stationary support post 128 is affixed to the central bar 122 and extends in the vertical direction z. In turn, a second or movable support post 130 is mounted for movement along the length of the central bar 122, to adjust the separation between the stationary support post 128 and the movable support post 130. The second or movable support post 130 also extends in the vertical direction z. The first support assembly 112 and second support assembly 114 are vertically movably mounted to the first or stationary support post 128 and the second or movable support post 130, respectively. The movable support post 130 mounted for movement along the length of the central bar 122 allows to move the second support assembly 114 longitudinally relative to the first support assembly 112. The first support assembly 112 and the second support assembly 114 are offset from the central bar 122. The first transverse bar 124 is secured to the central bar 122 by a first anchor plate 132 and the second transverse bar 126 is secured to the central bar 122 by a second anchor plate 134 (FIG. 2). Bolts 136 secure the first transverse bar 124 to the central bar 122 and bolts 138 (FIG. 2) secure the second anchor plate 134 to the central bar 122. The first anchor plate 132 additionally fixedly secures the stationary support post 128 to the central bar 122 with additional bolts 136. Although the layout shown in FIG. 1 locates the first support assembly with driven rollers as shown on the left and the second support assembly with free rollers as shown on the right, this arrangement may be mirrored about the x axis to be the opposite.

In a non-limiting example, the aforementioned bars 122, 124, and 126 and posts 128 and 130 may be manufactured by aluminum extrusion. For example, the central bar 122, the first or stationary support post 128 and the second or movable support post 130 may be 20/40 elongated, rectilinear aluminum extruded pieces, while the first and second transverse bars 124 and 126 may be 20/20 elongated, rectilinear aluminum extruded pieces. In some embodiments, some or all of said bars or posts 122, 124, 126, 128 and 130 may be commercially-available pieces that may be easily and conveniently cut to the desired length to achieve a desired shape and size of the rotary laser engraving device 100, in order, for instance, to rapidly and conveniently repair or re-size the device 100. Thus, an advantage of at least some embodiments of the invention is that on-site maintenance and repair of the device is facilitated.

As noted above, the movable support post 130 is mounted for longitudinal movement along the central bar 122 to move the second support assembly 114 longitudinally (i.e. in the longitudinal direction y) relative to the first support assembly 112 in order to accommodate objects to be engraved of various lengths. As can be seen in FIG. 1, the movable support post 130 may be fixedly mounted on a glide plate 140 which may, in turn, be slidably mounted to the central bar 122. The glide plate 140 includes freely rotatable wheels 142 and 144 which are rotatably mounted to the glide plate 140 and which ride within and along respective longitudinally extending tracks 146 and 148 formed in the central bar 122. In some embodiments, the freely rotatable wheels 142 and 144 may be V-slot wheels or rollers. While not specifically shown, in some embodiments, the glide plate 140 may include at least another freely rotatable wheel which rides in one of the longitudinally extending tracks 146 and 148 to better stabilize the glide plate 140 as it moves along the central bar 122.

With continued reference to FIG. 1, the rotary laser engraving device 100 of the first embodiment includes a longitudinal adjustment mechanism 150 configured to move the glide plate 140, and thus the movable support post 130 and the second support assembly 114, longitudinally along the central bar 122. The longitudinal adjustment mechanism 150 includes a lead screw 152 arranged along the longitudinal direction y and parallel to the central bar 122. A first end 154 of the lead screw 152 is rotatably mounted in a pillow block bearing 156 affixed to the first transverse bar 124. As shown in FIGS. 2 and 6, a second end 158 of the lead screw 152 is rotatably mounted in a pillow block bearing 160 affixed to the second transverse bar 126. A translational, yet non-rotational, internally-threaded anti-backlash nut or drive collar 162, shown for instance in FIG. 2, is affixed to the glide plate 140 and is threadingly mounted on the lead screw 152, such that rotation of the lead screw 152 causes a translation of the drive collar 162 along the lead screw 152, thus causing the glide plate 140 to move longitudinally along the lead screw 152 and thus along the central bar 122. As shown in FIGS. 1 and 2, a first adjustment wheel or knob 164 is affixed to the lead screw 152 to allow a user to easily rotate the lead screw 152 and thereby adjust the longitudinal position of the second support assembly 114 relative to the first support assembly 112. Bolts 166 and 168 (FIG. 2) are used to secure the bearings 156 and 160 to the first and second transverse bars 124 and 126, respectively.

Turning now to the first support assembly 112, as noted above, the first support assembly 112 is mounted for vertical movement along the stationary support post 128 to adjust for various sizes and diameters of objects to be engraved. The first support assembly 112 includes a first bracket 170 which is slidably mounted to the stationary support post 128. As shown in FIGS. 1 and 2, the first bracket 170 includes an inner plate 172 and an outer plate 174, between which a set of rollers 176 and 178 are arranged. In some embodiments, the rollers 176 and 178 may be V-slot wheels or rollers. The rollers 176 and 178 ride in and along tracks 180 and 182, respectively, formed in the stationary support post 128. An axle 184 extends through the roller 176 and interconnects the inner plate 172 to the outer plate 174. Likewise, an axle 186 extends through the roller 178 and also interconnects the inner plate 172 to the outer plate 174. Thus, the inner plate 172 and the outer plate 174 are "clamped" about the stationary support post 128 and are vertically movable along the stationary support post 128 (by the rollers 176, 178 rolling along the tracks 180, 182) to raise and lower the first support assembly 112 on the stationary support post 128. Specifically, the inner plate 172 mounts and supports the driven rollers 116, the motor assembly 120 and a gripping mechanism, such as a spring-loaded clamp 188 of the first support assembly 112. The spring-loaded clamp 188 is provided to abut against an inner surface of an object to be engraved, such that the object to be engraved is secured against the driven rollers 116 as is described in more detail hereinbelow.

Figure 5:
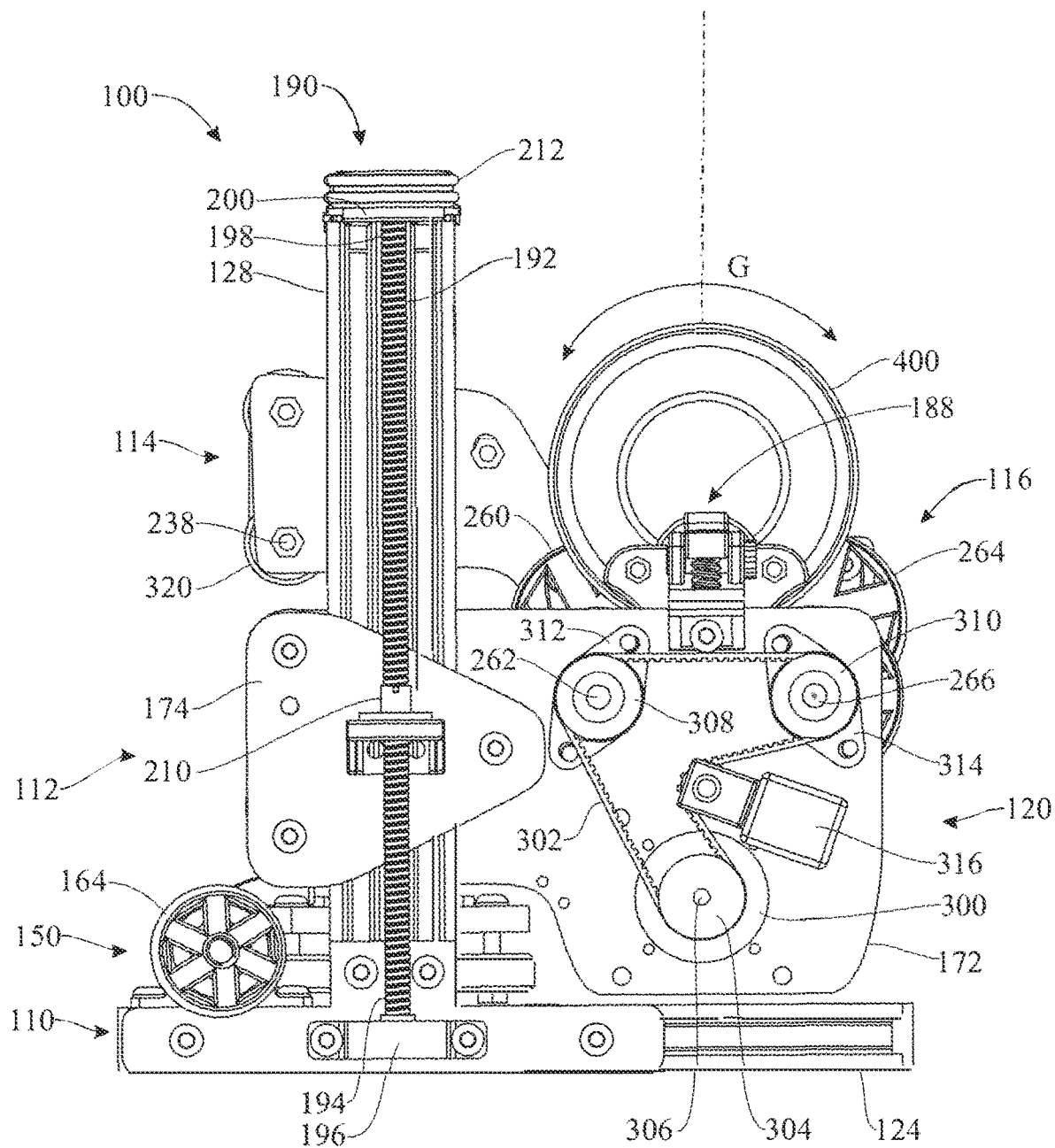
FIG. 5 presents a side elevation view of the rotary laser engraving device of FIG. 1, illustrating a drive assembly associated with the first support assembly of the laser engraving device.

In order to move the first support assembly 112 on the stationary support post 128, the rotary laser engraving device 100 includes a first vertical adjustment mechanism 190. The first vertical adjustment mechanism 190 of this embodiment includes a first vertical lead screw 192. As shown in FIGS. 1 and 5, the first vertical lead screw 192 is supported at a first or lower end 194 by a pillow block bearing 196 affixed to the first anchor plate 134 and at a second end 198 by a pillow block bearing 200 affixed to a top plate 202 which in turn is affixed to a top end 204 of the stationary support post 128. Bolts 206 secure the pillow block bearing 196 to the first anchor plate 134 while bolts 208 secure the top plate 202 to the top end 204 of the stationary support post 128. A translational, internally-threaded anti-backlash nut or drive collar 210 is affixed to the outer plate 174 of the first bracket 170 such that rotation of the first vertical lead screw 192 within the pillow block bearings 196 and 200 causes the internally threaded drive collar 210, and thus the first bracket 170 and first support assembly 112, to translate vertically along the first vertical lead screw 192 to thereby adjust the height of the set of driven rollers 116 of the first support assembly 112. A second adjustment wheel or knob 212 is affixed to the first vertical lead screw 192 to facilitate rotating the first vertical lead screw 192 to thereby adjust the height of the first support assembly 112.

As with the glide plate 140 described hereinabove, the first support assembly 112 may include additional wheels positioned between the inner plate 172 and the outer plate 174 of the first bracket 170 to stabilize the movement of the first bracket 170 along the stationary support post 128.

Turning now to the second support assembly 114, similarly to the first support assembly 112 and as shown in FIG. 1, the second support assembly 114 generally includes a second bracket 220 having an inner plate 222 and an outer plate 224. The inner plate 222 and the outer plate 224 are spaced apart from one another, and rollers 226 and 228 are arranged between the inner and outer plates 222 and 224. The rollers 226 and 228 ride in and along respective tracks 230 and 232 formed in the movable support post 130. In some embodiments, the rollers 226 and 228 may be V-slot wheels or rollers. Axles 234 and 236 extend through the rollers 226 and 228, respectively, and secure the inner plate 222 to the outer plate 224 to thereby clamp the second support assembly 114 about the movable support post 130. A third axle 238 may support a third roller 320 (FIG. 5), to further stabilize the second bracket 220 on the movable support post 130. The second support assembly 114 may further include a stop member or heel plate 119, extending generally between and above the set of free rollers 118, for purposes that will be hereinafter described. The heel plate 119 may be disconnectably secured to the inner plate 222, such as, but not limited to, by a thumb screw 119a (FIG. 2).

In order to move the second support assembly 114 along the movable support post 130, the rotary laser engraving device 100 further includes a second vertical adjustment mechanism 240. The second vertical adjustment mechanism 240 of this embodiment includes a second vertical lead screw 242. As shown in FIG. 6, the second vertical lead screw 242 is secured at a first end 244 in a pillow block bearing 246 affixed to the glide plate 140 and at a second end 248 in a pillow block bearing 250 secured to a top plate 252 mounted on a top end 254 of the movable support post 130. The second vertical adjustment mechanism 240 further includes a translational, internally-threaded anti-backlash nut or drive collar 256 threadingly mounted for movement along the second vertical lead screw 242 and secured to the outer plate 224. Thus, movement of the threaded drive collar 256 vertically along the second vertical lead screw 242, responsively to rotation of the second vertical lead screw 242, moves the second support assembly 114, including the free rollers 118, vertically with respect to the frame assembly 110. A third adjustment wheel or knob 258 is provided to facilitate rotating the second vertical lead screw 242 to vertically adjust the height of the free rollers 118.

Referring specifically to FIGS. 2 and 6, the driven rollers 116 of the first support assembly 112 include an inner driven roller 260 mounted on an inner axle 262 and an outer driven roller 264 mounted on an outer axle 266. Likewise, as shown in FIGS. 1 and 2, the free rollers 118 of the second support assembly 114 include an inner free roller 268 mounted on an inner axle 270 and an outer free roller 272 mounted on an outer axle 274. The inner and outer axles 270 and 274 extend through the inner plate 172 and are rotatably supported thereon by respective pillow block bearings 276 and 278 affixed to the inner plate 172. Similarly, the inner and outer axles 270 and 274 extend through the inner plate 222 and are rotatably supported thereon by respective pillow block bearings 280 and 282 affixed to the inner plate 222.

As shown in FIG. 2, the inner and outer axles 262 and 266 supporting the inner and outer driven rollers 260 and 264, respectively, define respective axes a-a and a'-a' and the inner and outer axles 270 and 274 supporting the inner and outer free rollers 268 and 272, respectively, define respective axes b-b and b'-b'. The axes a-a and a'-a' and the axes b-b and b'-b' are parallel to each other and parallel to a central axis c-c defined by and extending longitudinally (i.e. in the longitudinal direction y) through an object to be engraved. It should be noted that the set of driven rollers 116 and the set of free rollers 118 are horizontally offset from the central bar 122 placing the central axis c-c of the object to be engraved offset a horizontal distance D in the direction of the x axis from a central longitudinal axis e-e of the central bar 122.

Figure 3:
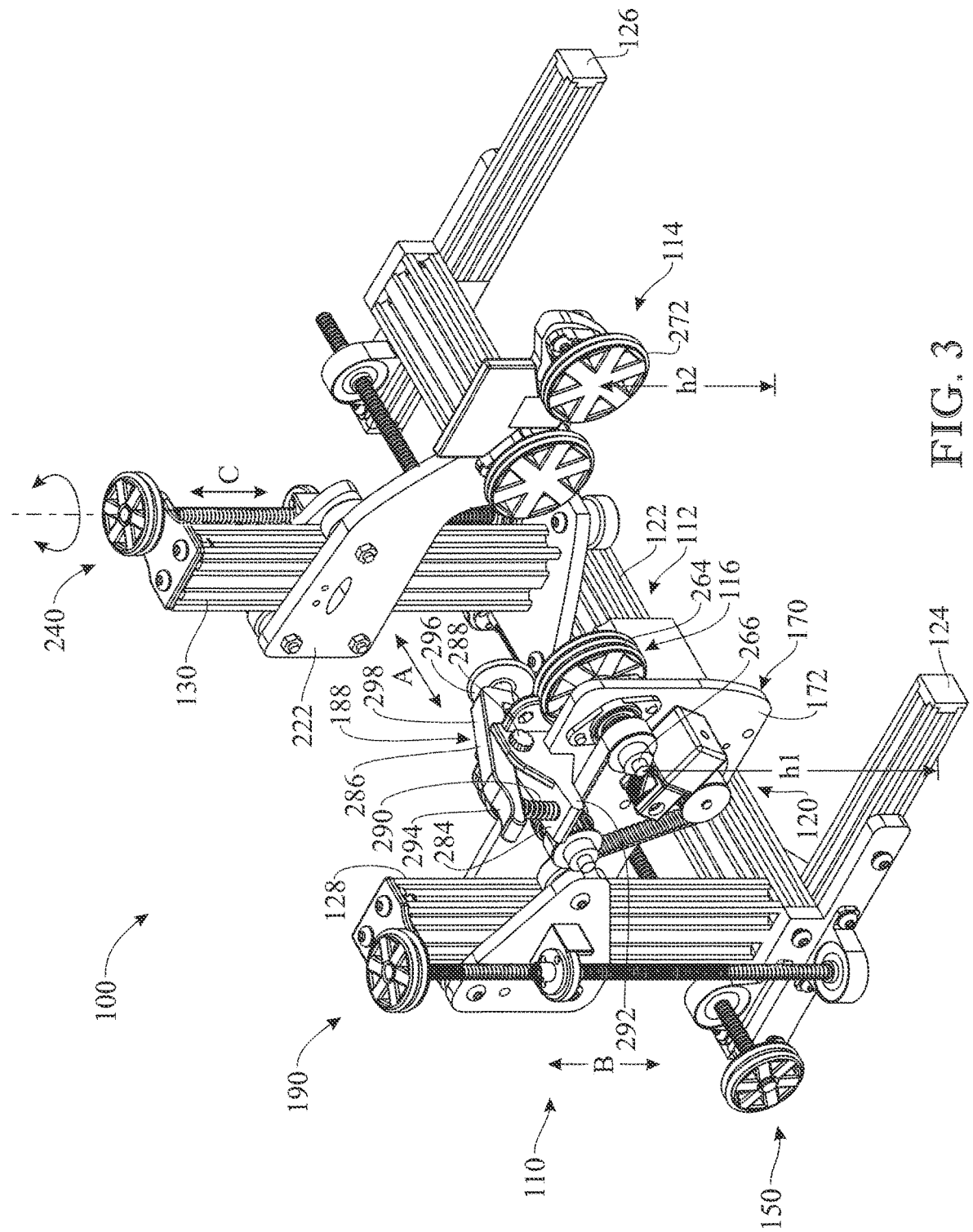
FIG. 3 presents a top, front isometric view, similar to FIG. 1, of the rotary laser engraving device with the second support assembly moved horizontally closer to the first support assembly.

Referring for the moment to FIGS. 2 and 3, the second support assembly 114 is movable along the length of the central bar 122 in the longitudinal direction y, as indicated by arrow A, towards and away from the first support assembly 112 by operation of the longitudinal adjustment mechanism 150. The first support assembly 112 is moved in the vertical direction z, as indicated by arrow B, to a predetermined or selected height h1 on the stationary support post 128 by the first vertical adjustment mechanism 190. In the illustration of FIG. 3, the height h1 is the distance between one of the axes of the set of driven rollers 116, for example the axis a'-a' of the outer axle 266 of the outer driven roller 264, and the ground or platform the rotary laser engraving device 100 is positioned on. It should be noted that the first vertical adjustment mechanism 190 is operable to vary the height h1 as needed.

Figure 4:
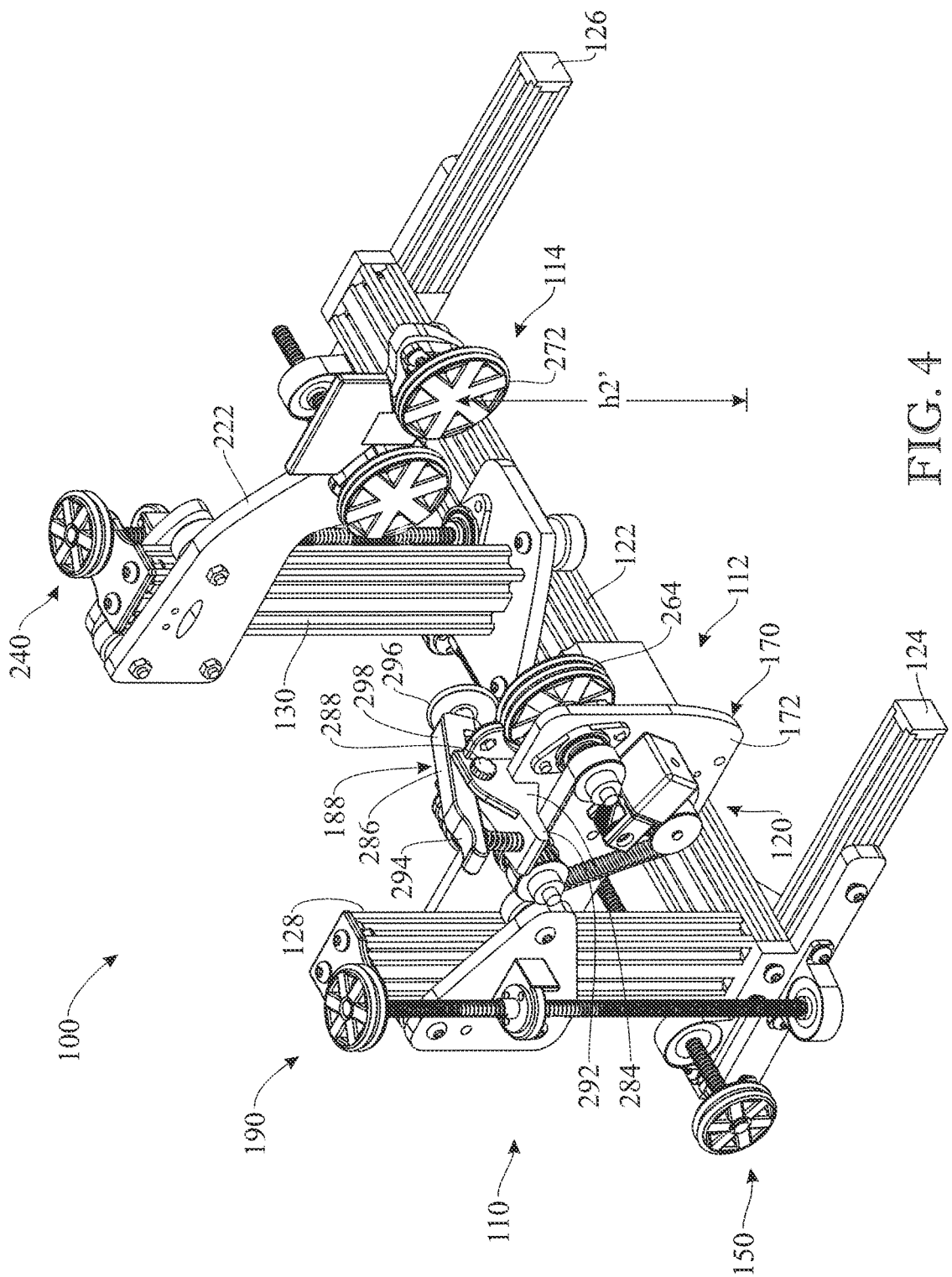
FIG. 4 presents a top, front isometric view, similar to FIG. 3, of the rotary laser engraving device with the second support assembly adjusted fully vertically relative to the first support assembly.

The second support assembly 114 is illustrated in a first position or height h2 on the movable support post 130 (FIG. 3) and in a second position h2' higher than the first position along the movable support post 130 (FIG. 4). In the first and second illustrated positions, the heights h2 and h2' are the distances between the outer axle 274 of the outer free roller 272 and the ground or platform the rotary laser engraving device 100 is positioned on (FIG. 4). As noted hereinabove, the height of the second support assembly 114 is adjusted in the vertical direction z, also indicated by arrows C (FIG. 3), by operation of the second vertical adjustment mechanism

240. It should be noted that the measurements of the various heights, for example heights h1, h2, h2', etc. are relative and are given to illustrate that the first and second vertical adjustment mechanisms 190 and 240 are independently adjustable and vary the heights of the first and second support assemblies 112 and 114 on the respective stationary support post 128 and the movable support post 130 in order to adjust for various sizes and/or diameters of the objects to be engraved.

Accordingly, shown in FIGS. 2 to 4, the set of driven rollers 116 of the first support assembly 112 and the set of free rollers 118 of the second support assembly 114 are diagonally offset from the central bar 122. The offset is shown as both horizontal in the x direction and vertical in the z direction.

With continued reference to FIG. 3, and as noted hereinabove, in one aspect, the spring-loaded clamp 188 is mounted on the inner plate 172 of the first support assembly 112 and is provided to secure an object to be engraved against the set of driven rollers 116. The spring-loaded clamp 188 generally includes a frame mount 284 fixedly secured to the inner plate 172 of the first bracket 170 and a movable top clamp 286 pivotally mounted on the frame mount 284 by a pivot pin 288. A compression spring 290 is provided between a first end 292 of the frame mount 284 and a first end 294 of the movable top clamp 286 to bias a clamp wheel 296, rotatably mounted on a second end 298 of the movable top clamp 286 opposite the first end 294, against an object to be engraved thereby securing the object to be engraved between the clamp wheel and the set of driven rollers 116. It should be noted that the clamp wheel 296 rotates with the object to be engraved as the object to be engraved is rotated by the set of driven rollers 116 as described in more detail herein below.

Referring now to FIG. 5, as noted hereinabove, in order to rotate the set of driven rollers 116, and thus rotate the object to be engraved, for example, cup 400, the rotary laser engraving device 100 includes the motor assembly 120. The motor assembly 120 of this embodiment is carried by the first bracket 170 and is raisable and lowerable along the first or stationary support post 128, and generally includes a motor 300 and a drive belt 302 drivingly connecting the motor 300 to the set of driven rollers 116. Specifically, in some embodiments, the motor assembly 120 may include a motor drive pulley 304 mounted on a drive axle 306 of the motor 300, a first cog pulley 308 fixedly mounted on the inner axle 262 of the inner driven roller 260 and a second cog pulley 310 fixedly mounted on the outer axle 266 of the outer driven roller 264. The inner and outer axles 262 and 266 are rotatably supported on the inner plate 172 by respective mounting brackets 312 and 314. The drive belt 302 surrounds and connects the motor drive pulley 304 with the first and second cog pulleys 308 and 310 to rotate the set of driven rollers 116, specifically the inner driven roller 260 and the outer driven roller 264. In a non-limiting example, the motor 300 is "hot-swappable" between NEMA 17 type motors or NEMA 23 type motors. A tensioner 316 is provided and is engageable with the drive belt 302 to tension the drive belt 302 about the motor drive pulley 304, the first cog pulley 308 and the second cog pulley 310; in some embodiments, the tensioner 316 may be mounted to the inner plate 172. Thus, rotation of the motor 300 rotates the set of driven rollers 116 to thereby rotate the cup 400 as it is engraved by an associated laser engraving device (not shown).

Turning to FIGS. 1-8, and initially with regard to FIG. 1, the use of the rotary laser engraving device 100 to mount and engrave an object, for example cup 400 (FIG. 6), will now be described. In the initial position or condition, as shown in FIG. 1, the second support assembly 114 may be arranged at the longitudinally farthest position from the first support assembly 112 along the central bar 122, and the first and second support assemblies 112 and 114, respectively, may be arranged at their lowest positions or heights with respect to the central bar 122.

Figure 7:
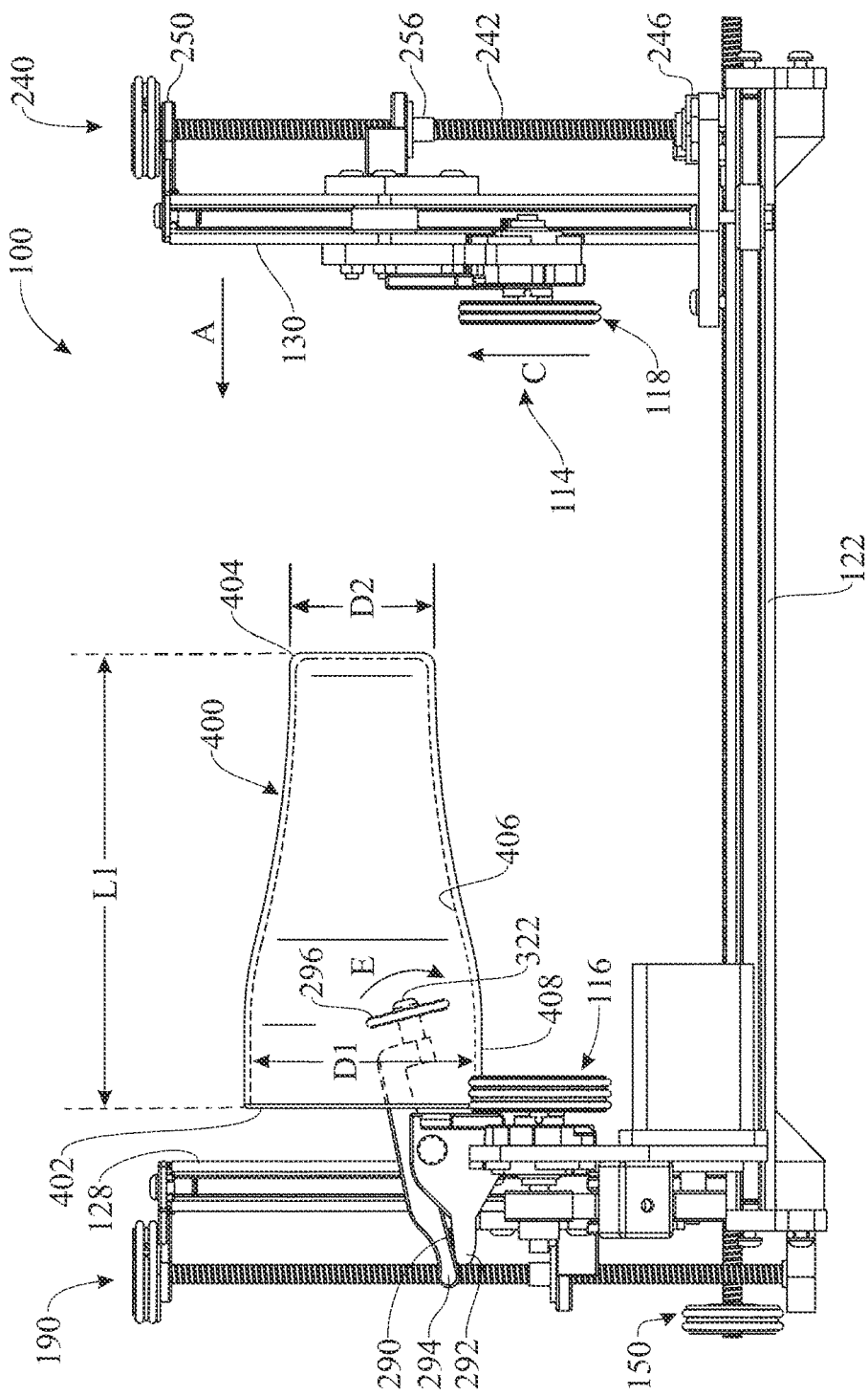
FIG. 7 presents a front elevation view of the rotary laser engraving device of FIG. 1, with a first end of the object to be engraved positioned on driven rollers of the first support assembly.

As shown in FIGS. 6 and 7, the cup 400 to be laser engraved includes a first or open end 402 having a first diameter D1 and a second or closed end 404 having a second diameter D2 which, in this example, is less than D1. The cup 400 also has a length L1. In order to accommodate the dimensions of the cup 400, the rotary laser engraving device 100 may be preadjusted to facilitate mounting the cup 400 on the rotary laser engraving device 100. Referring to FIGS. 1 and 2, the longitudinal adjustment mechanism 150 may be operated to move the movable support post 130, and thus the second support assembly 114, towards the first support assembly 112 in the longitudinal direction x (also indicated by arrow A) to pre-position the second support assembly 114 to an estimated size of the cup 400 (shown in phantom in FIG. 2).

As best shown in FIG. 3, in a specific method, the second support assembly 114 may also be pre-positioned. The first support assembly 112 may be raised in the vertical direction z (as indicated by arrow B) to the desired height by operation of the first vertical adjustment mechanism 190 to pre-position the set of driven rollers 116 and the spring-loaded clamp 188 in a position to receive the open first end 402 of the cup 400. The second vertical adjustment mechanism 240 may be operated to move the second support assembly 114 in the vertical direction z (as indicated by arrow C) from the initial lower position (FIG. 3) to a second higher position (FIG. 4).

Figure 8:
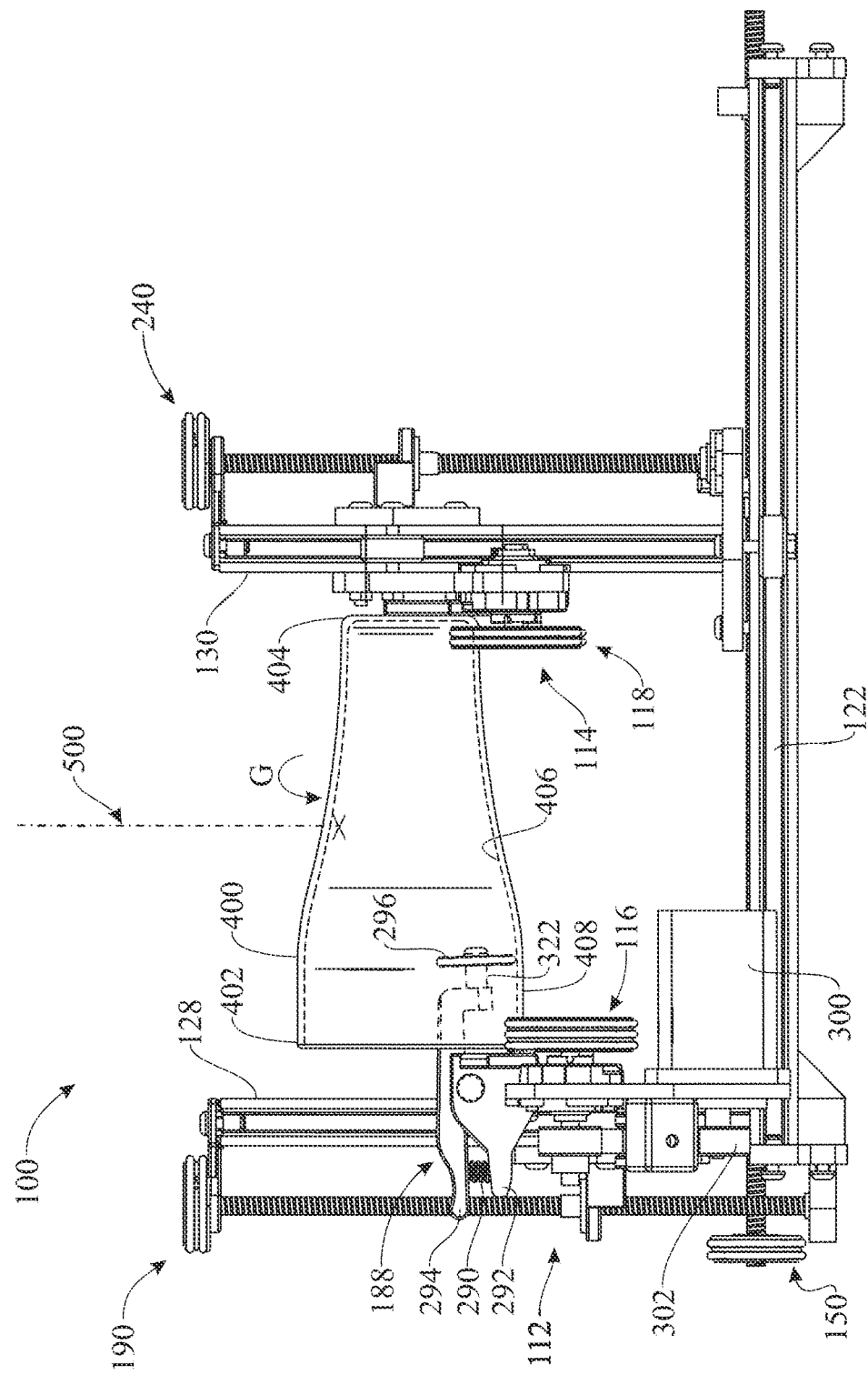
FIG. 8 presents a front elevation view, similar to FIG. 7, of the rotary laser engraving device of FIG. 1, with the object to be engraved secured in the first support assembly and the second support assembly moved horizontally towards the first support assembly to position a second end of the object to be engraved on free rollers of the second support assembly.

With regard to FIGS. 7 and 8, the cup 400 is placed on the rotary laser engraving device 100. This step can be carried out, for instance and without limitation, with the first and second support assemblies 112 and 114 arranged in the initial position of FIG. 1, as shown, or with the first and second support assemblies 112 and 114 pre-positioned relative to one another as described heretofore. To place the cup 400 on the device, the operator may manually operate the spring-loaded clamp 188 by pressing the first ends 292 and 294 towards one another, thereby pivoting the top clamp 286 about the pivot pin 288 and compressing the spring 290, to separate the clamp wheel 296 from the set of driven rollers 116 (i.e. to open the spring-loaded clamp 188). As shown in FIG. 7, with the spring-loaded clamp 188 in the open position, the first open end 402 of the cup 400 is then positioned on the set of driven rollers 116 and the top clamp 286 is inserted into the cup 400 through the open first end 402. The user may then release the first ends 292 and 294, allowing top clamp 286 to automatically pivot in the direction of arrow E, by action of the compression spring 290, causing the clamp wheel 296 to eventually contact and engage an inner side or surface 406 of the cup 400, as shown in FIG. 8. As shown, the clamp wheel 296 of the spring-loaded clamp 188 is mounted on an axle 322 of the spring-loaded clamp 188 and, in engaging the inner surface 406 of the cup 400, the clamp wheel 296 can both bias and retain an outer surface 408 of the cup 400 against the set of driven rollers 116 and also roll along the inner surface 406 of the cup 400. The cup 400 is thereby positioned on or loaded in the first support assembly 112 in a condition to be rotated by the motor assembly 120 and the set of driven rollers 116.

Thereafter, the second support assembly 114 is moved towards the cup 400 in the direction of arrow A by the longitudinal adjustment mechanism 150, and the set of free rollers 118 of the second support assembly 114 are raised by the second vertical adjustment mechanism in the direction of arrow C to contact the closed second end 404 of the cup 400 such that the set of free rollers 118 support the second end 404 of the cup 400. Furthermore, in cases where the cup or object to be engraved has an irregular or odd shape, the heel plate 119 may optionally be mounted to the inner plate 222 (e.g., via the thumb ring 119*a*) and may provide a longitudinal stop which contributes to prevent "walking" of the cup or item as the item is rotated; in other cases, such as if the object to be engraved is particularly long (e.g., a baseball bat), the device operator or user may choose not to mount the heel plate 119, to allow the object to be engraved to extend beyond the set of free rollers 118. Additionally, in cases where the cup or object is short in height, it may be sufficiently supported only by the driven rollers 116 and the gripping mechanism (similar to the initial mounting shown in FIG. 7). In summary, the rotary laser engraving device 100 is configured to fully and firmly support a wide variety of objects (e.g., the cup 400) as the object is rotated by the set of driven rollers 116.

As best shown in FIGS. 5 and 8, once the cup 400 has been properly positioned and secured to the rotary laser engraving device 100, the motor 300 can be operated to rotate the drive belt 302 and thus rotate the set of driven rollers 116. Rotation of the set of driven rollers 116 rotates the cup 400 within the rotary laser engraving device 100 and about a central longitudinal axis of the cup 400 as indicated by arrow G, while the cup 400 remains rotatably clamped by the clamp wheel 296. Thereafter, a laser associated with the rotary laser engraving deceive 100 is actuated to project an engraving level laser beam 500 onto the cup 400 to engrave the desired images, logos, etc. into the cup 400.

Figure 9:
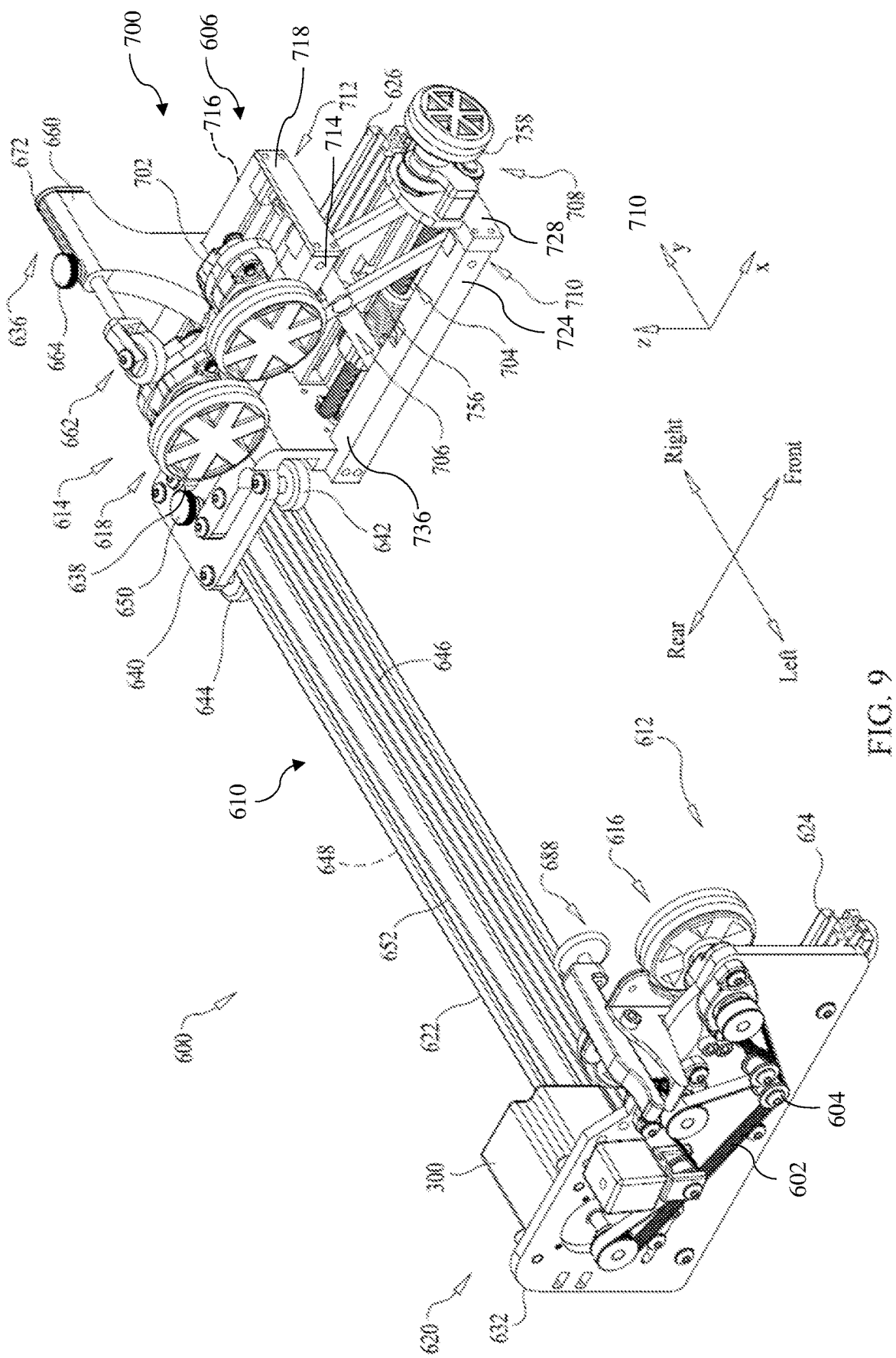
FIG. 9 presents a top, front left perspective view of a rotary laser engraving device in accordance with an illustrative second embodiment.
Figure 10:
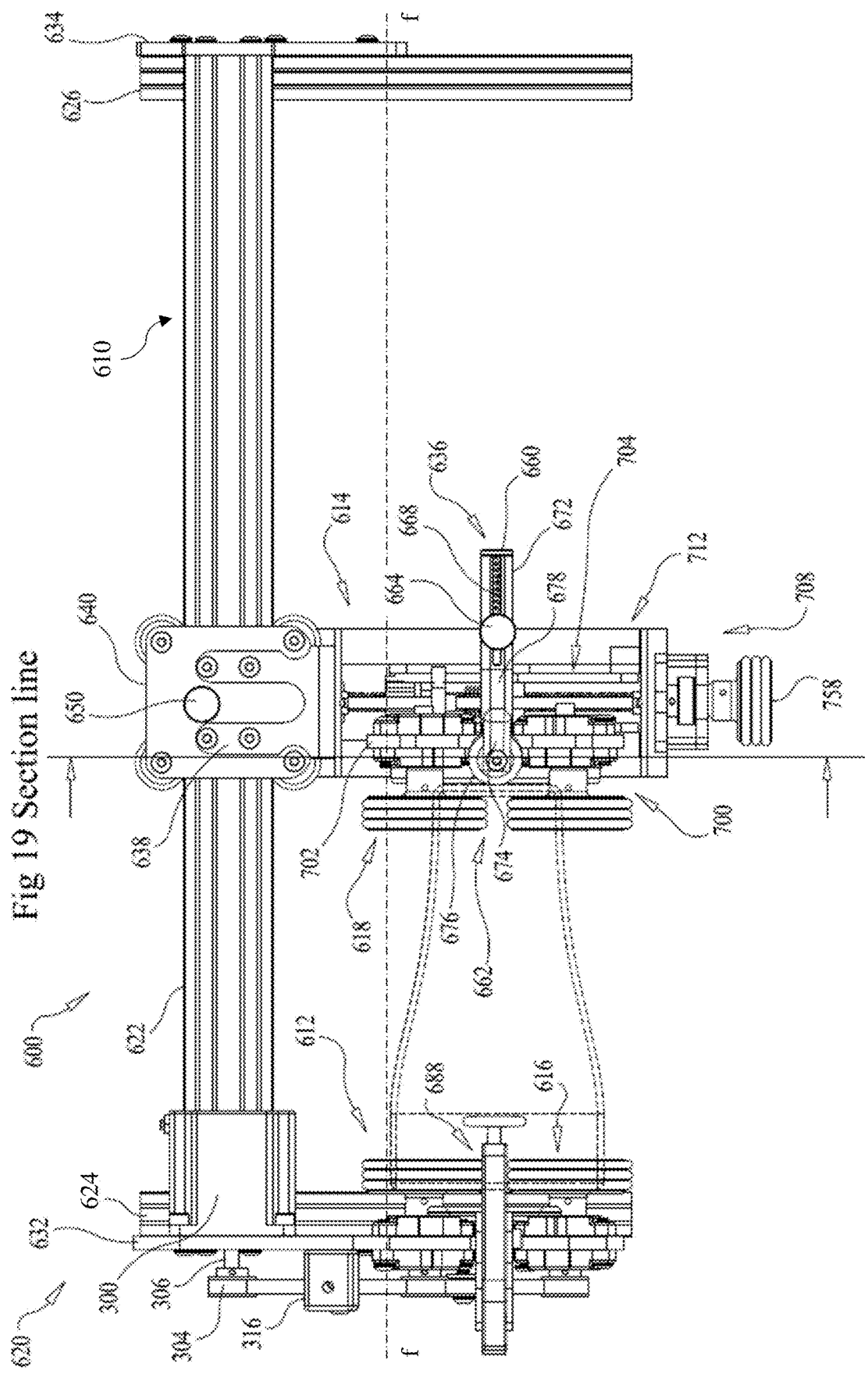
FIG. 10 presents a top plan view, similar to the rotary laser engraving device of FIG. 9, with the second support assembly moved horizontally closer to the first support assembly to be in the "operation" position, with an object to be engraved fully supported on the first and second support assemblies.
Figure 11:
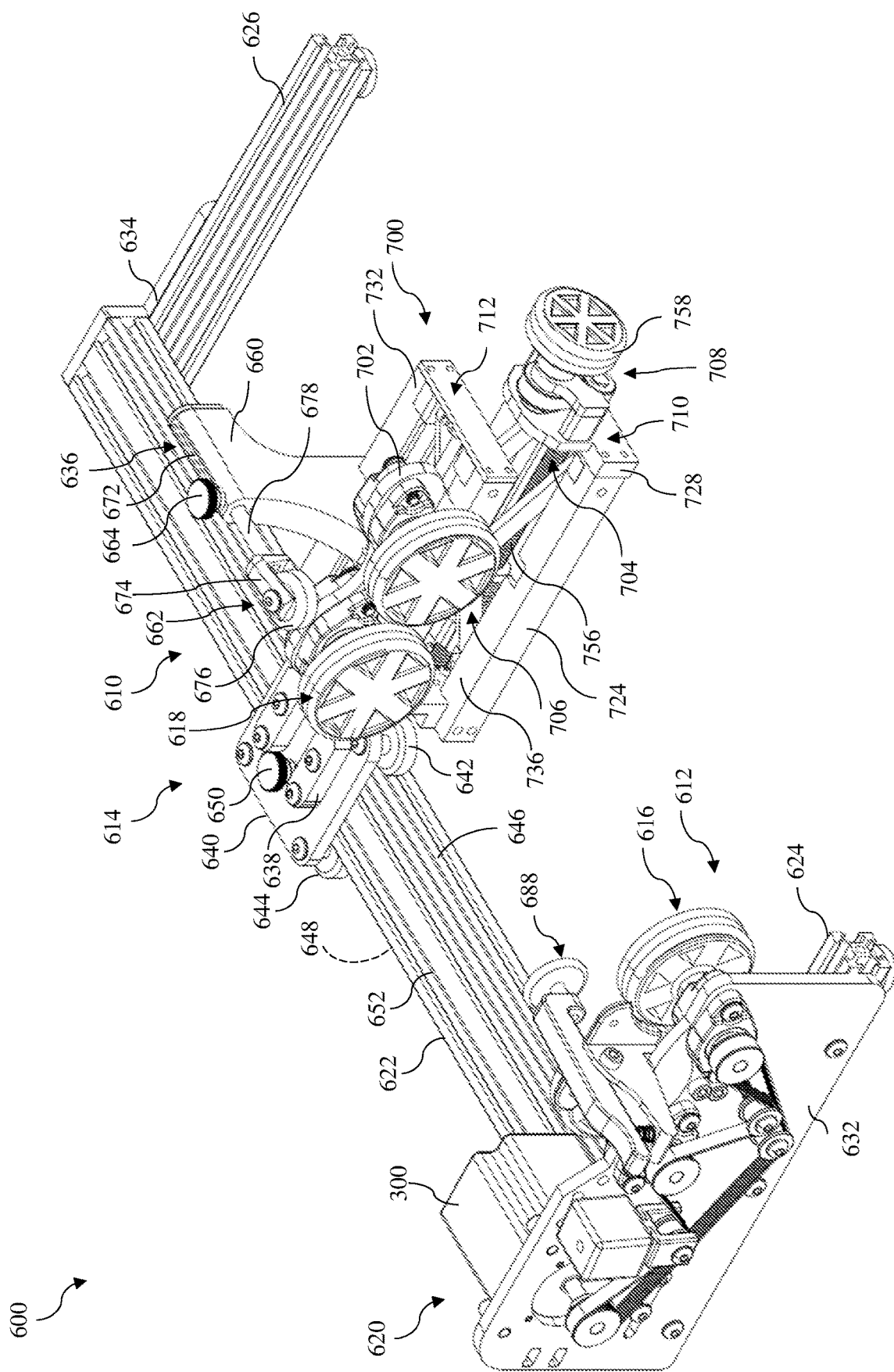
FIG. 11 presents the top, front left perspective view of the rotary laser engraving device of FIG. 10, with the object removed for clarity.

Referring initially to FIGS. 9 and 10, a rotary laser engraving device 600 is illustrated in accordance with an exemplary second embodiment. The rotary laser engraving device 600 generally includes a frame assembly 610, a first support assembly 612 mounted on the frame assembly 610 and a second support assembly 614 movably mounted on the frame assembly 610. In the second embodiment, the first support assembly 612 is non-movable relative to the frame assembly 610 in a vertical direction z. The second support assembly 614 is movable relative to the frame assembly 610 in a horizontal, longitudinal direction y perpendicular to the vertical direction z, to accommodate varying lengths of objects to be engraved. The upper portion 606 of the second support assembly 614 is movable relative to the frame assembly 610 in the vertical direction z in order to adjust for various sizes and/or diameters of the objects to be engraved. The first support assembly 612 and the second support assembly 614 are off-centered from the frame assembly 610. More details are described hereinbelow.

Figure 14:
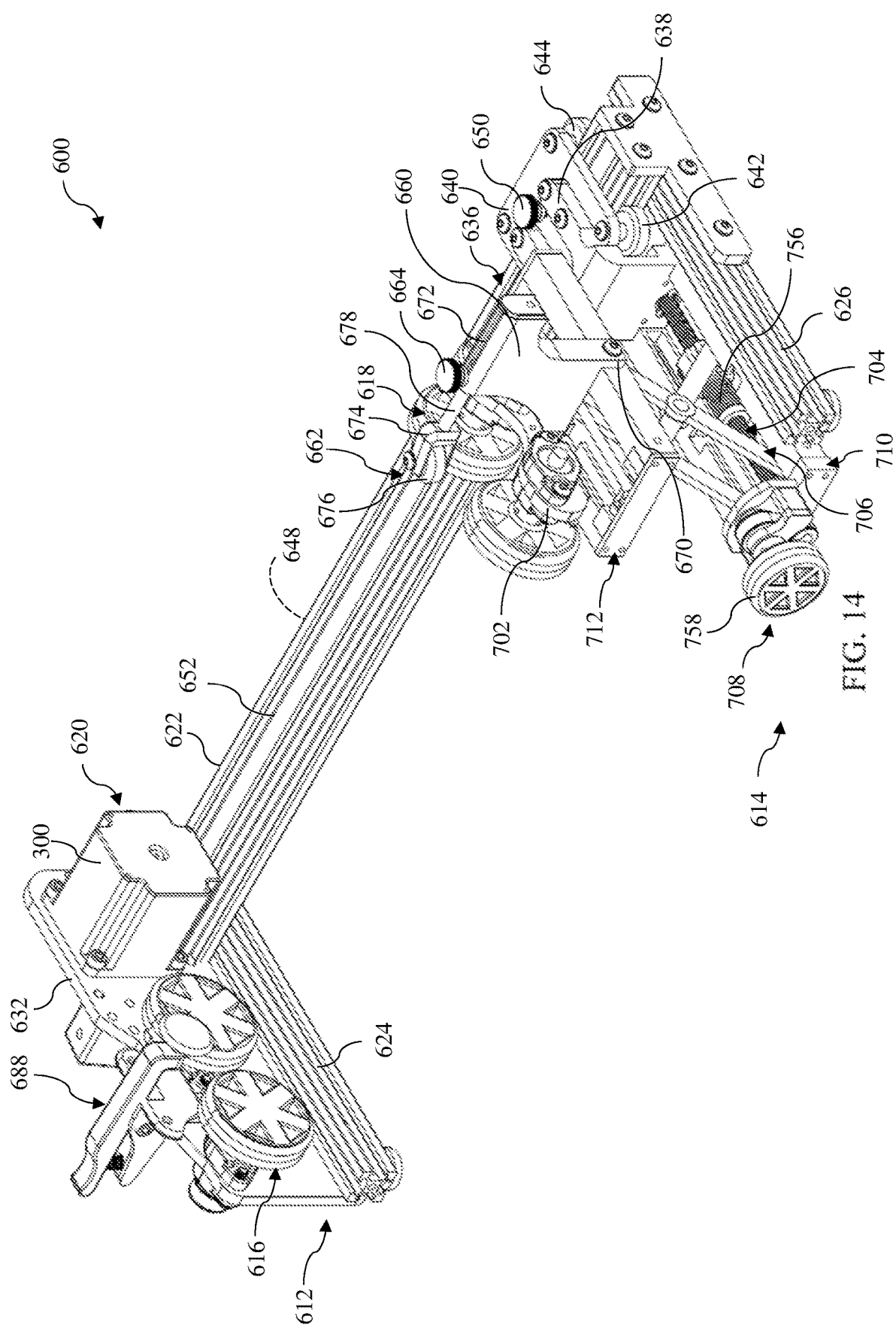
FIG. 14 presents a top, front right perspective view of the rotary laser engraving device of FIG. 9.

As shown in FIGS. 9 and 14, similar to the first embodiment, the first support assembly 612 includes a set of driven rollers 616 for supporting and rotating a first (head) end or portion of an object to be engraved, while the second support assembly 614 includes a set of free rollers 618 to support a second (rear) end or portion of the object and allow the object to be engraved to rotate freely relative to the second support assembly. A motor assembly 620 is provided to rotate the set of driven rollers 616 of the first support assembly 612 and thus rotate the object to be engraved as it is being engraved by an associated laser mechanism (not shown). Although the layout shown in FIG. 9 locates the first support assembly with driven rollers as shown on the left and the second support assembly with free rollers as shown on the right, this arrangement may be mirrored about the x axis to be the opposite.

In order to support the first and second support assemblies 612 and 614, respectively, the frame assembly 610 generally includes a central rail or bar 622, which may be arranged in the longitudinal direction y. The central bar 622 may be affixed to a first transverse bar 624 and a second transverse bar 626. The first and second transverse bars 624 and 626 may extend in a horizontal, transverse direction x that is perpendicular to the longitudinal direction y and vertical direction z. The first and second transverse bars 624 and 626 may stabilize the central bar 622, and thus the entire rotary laser engraving device 600, during operation of the motor assembly 620 and the engraving process.

The first support assembly 612 and the second support assembly 614 are offset from the central bar 622. The first transverse bar 624 is secured to the central bar 622 by a first anchor plate 632 and the second transverse bar 626 is secured to the central bar 622 by a second anchor plate 634 (FIG. 14). The first support assembly 612 includes one or more retention features configured to retain the object to be engraved. Such retention feature may be a tactile, soft elastic covering material, such as rubber or silicone on the exterior surface of the driven rollers 616, which serve to retain longer objects, such a baseball bats (not shown). In other applications with smaller objects, such as beer bottles, the retention features may also include a gripping mechanism, such as at least one clamp, configured to bias the outer surface of the object to be engraved against the set of driven rollers 616 (not shown). In other applications with wide mouthed objects, such as tumbler bottles, the gripping mechanism may be a spring-loaded head clamp 688, configured to abut against an inner surface of an object to be engraved, and bias the object against the set of driven rollers 616. The first anchor plate 632 mounts and supports the driven rollers 616, the motor assembly 620 and a gripping mechanism, such as the spring-loaded head clamp 688 of the first support assembly 612. The spring-loaded head clamp 688 retains the object to be engraved against the driven rollers 616, while allowing it to rotate, similar to the spring-loaded clamp 188 described above for the first embodiment.

As can be seen in FIGS. 9-12, and 14, the second support assembly 614 generally includes the free rollers 618, a rear wheel stop 636, a mounting bracket 638, a glide plate 640, and a vertical adjustment assembly 700. The mounting bracket 638 couples the vertical adjustment assembly 700 to the glide plate 640 and is configured to offset the vertical adjustment assembly 700 horizontally away from the front of central bar 622. The glide plate 640 is slidably mounted to the central bar 622, and is configured for longitudinal movement along the central bar to move the second support assembly 614 longitudinally (i.e. in the longitudinal direction y) relative to the first support assembly 612 in order to accommodate objects to be engraved of various lengths.

The glide plate 640 includes freely rotatable wheels 642 and 644 which are rotatably mounted to the glide plate 640 and which ride within and along respective longitudinally extending tracks 646 and 648 formed in the sides of central bar 622. The glide plate 640 includes a position adjustment knob 650 rotatably coupled to the top of the glide plate and configured to selectively engage a longitudinally extending track 652 formed in the top side of central bar 622. In order to slidably move the glide plate 640, and thus the second support assembly 614 longitudinally along the central bar 622, the user loosens the position adjustment knob 650, and retightens it once the free rollers 618 are in the desired position relative to the rear end or portion of the object being worked on.

The rear wheel stop 636 includes a base 660, a bumper 662, a stop knob 664, and a spring 668. The rear wheel stop 636 is configured to selectively retain the rear end of the object to be engraved. The base 660 is configured for removable coupling to the top of the vertical adjustment assembly 700. In one aspect the bottom of the base 660 includes a tab 670 (see FIG. 14), which extends downward and is configured for removable fastening to the top of the vertical adjustment assembly 700. The top of base 660 includes an elongated receptacle 672, which is configured to house spring 668 (see FIGS. 10, 14) and to house the threaded portion of stop knob 664. The bumper 662 includes a bracket 674, a wheel 676 and a stem 678. The stem 678 has a proximal end and a distal end, and the distal end has a coupling portion with a central aperture. The central axis of the central aperture being aligned in the z direction. The coupling portion 680 is disposed within the left end of receptacle 672. The bottom of stop knob 664 is rotatably coupled to the central aperture 682 of the distal end of bumper 662, and the stop knob is biased by spring 668 to set at the left end of the receptacle 672. The wheel 676 is rotatably mounted to bracket 674, and the bracket is coupled to the proximal end of stem 678. In use, the user will move the second support assembly 614 adjacent to the rear end of the object to be engraved, then adjust rear wheel stop 636 as needed. The stop knob 664 is configured to slidably move horizontally along receptacle 672 to a set position or to be left to ride/slide on the spring/bias tension to absorb any movement during engraving due to the object having imperfections. The rear wheel stop 636 is configured to provide low friction between the rear end of the object and wheel 676, and to prevent binding of the rear end of the object while maintaining the object in a secure position for engraving during rotation.

The vertical adjustment assembly 700 includes wheel mount bracket 702, a lead screw assembly 704, a scissor link assembly 706, an actuator 708, a base frame 710, and a head frame 712. Head frame 712 includes a first (left) head guideway 714, a second (right) head guideway 716 spaced apart from the first head guideway, a pair of opposing head plates 718, a center brace bar 720, and a center cross brace 722 slidingly mounted on the center brace bar. The front ends of the first head guideway 714 and second head guideway 716 are coupled to one of the head plates 718, and the rear ends of the first head guideway and second head guideway are coupled to the other of the head plates 718. The front end of the center brace bar 720 is coupled to an interior mount 730 on the (front) head plate 718 and the rear end of the center brace bar is coupled to an interior mount 730 on the (rear) head plate 718.

Base frame 710 includes a first (left) base guideway 724, a second (right) base guideway 726 spaced apart from the first base guideway, and a front base plate 728, spaced apart from the mounting bracket 638. The front ends of the first base guideway 724 and second base guideway 726 are coupled to the front base plate 728, and the rear ends of the first base guideway and second base guideway are coupled to the mounting bracket 638.

The first (left) head guideway 714 and the second (right) head guideway 716 each include a head top member 732 and a head bottom member 734 spaced apart from the head top member. The head bottom member 734 includes a stop cutout 740 disposed at a predetermined location. As described further below, the free rollers 618 are coupled to the wheel mount bracket 702, which is removably coupled to the first head guideway 714. The first (left) base guideway 724 and the second (right) base guideway 726 each include a base top member 736 and a base bottom member 738 spaced apart from the base top member. The base top member 736 includes a stop cutout 740 disposed at a predetermined location.

Referring to FIGS. 9, 10 and 13, 14, the driven rollers 616 of the first support assembly 612 and the free rollers 618 of the second support assembly 614 have similar structure, support, and relative orientation to each other as the driven rollers 116 of the first support assembly 112 and the free rollers 118 of the second support assembly 114 of the first embodiment as described above. In the second embodiment the driven rollers 616 are coupled to first anchor plate 632 and the free rollers 618 are coupled to wheel mount bracket 702 which is removably coupled to the first (left) head guideway 714 of head frame 712. Similar to the first embodiment, the set of driven rollers 616 and the set of free rollers 618 are horizontally offset from the central longitudinal axis of the central bar 622, and additionally diagonally offset from the central bar 622. The offset is shown as both horizontal in the x direction and vertical in the z direction.

The lead screw assembly 704 includes a primary lead screw 742, (having a first end 744 and a second end 746), a rear bushing bearing 750, a screw bracket 752, a front bushing bearing 754, and a translational, internally-threaded anti-backlash nut or drive collar 756. The translational, yet non-rotational, drive collar 756, best shown in FIGS. 17-19, is coupled to the screw bracket 752 and is threadingly mounted on the primary lead screw 742, such that rotation of the primary lead screw causes a translation of the drive collar and screw bracket back and forth along the primary lead screw, in the horizontal x direction, to cause extension and contraction of the scissor link assembly 706 and the head frame 712 in the vertical direction z.

Figure 17:
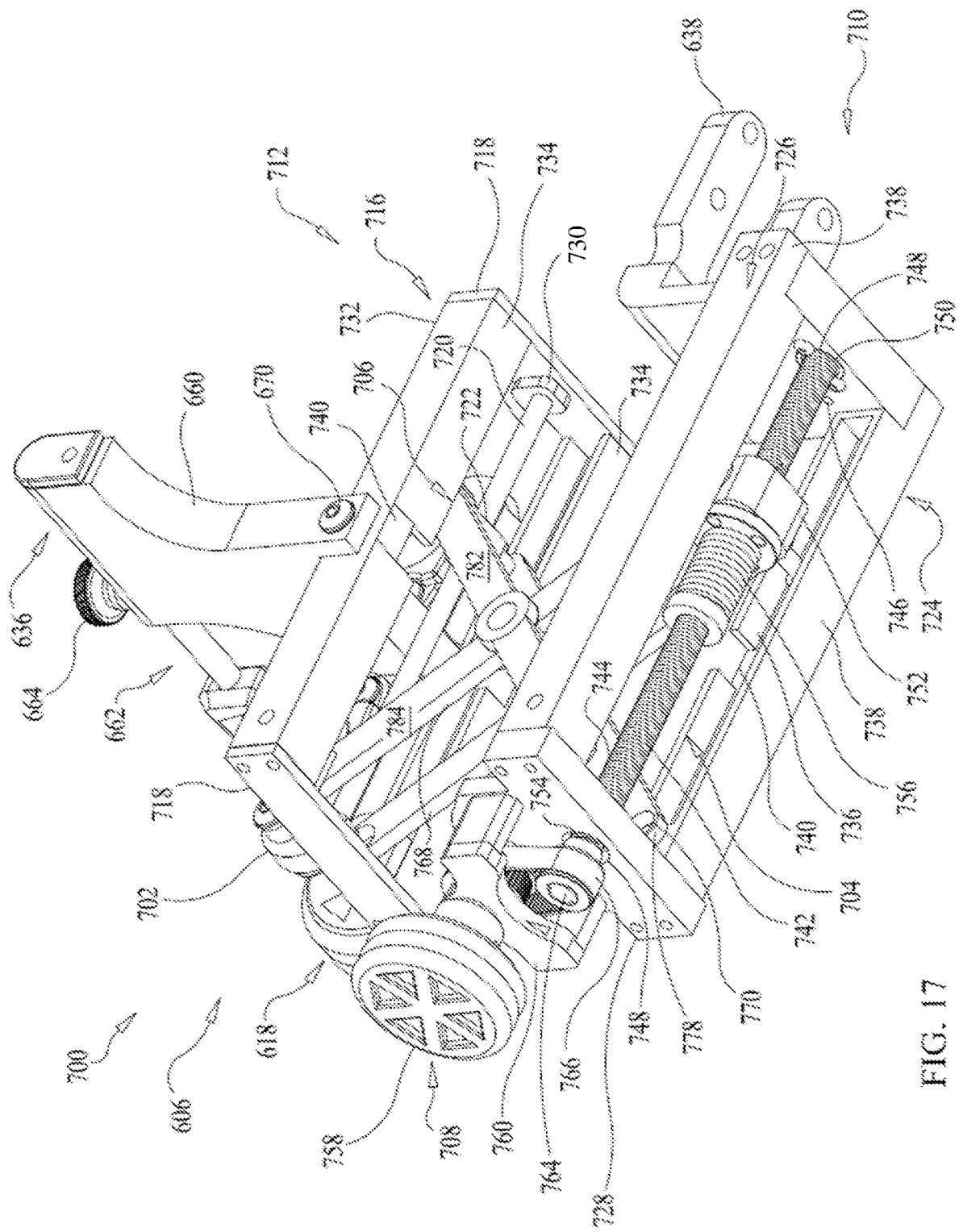
FIG. 17 presents a bottom, front right perspective view of the vertical adjustment assembly of FIG. 9.
Figure 18:
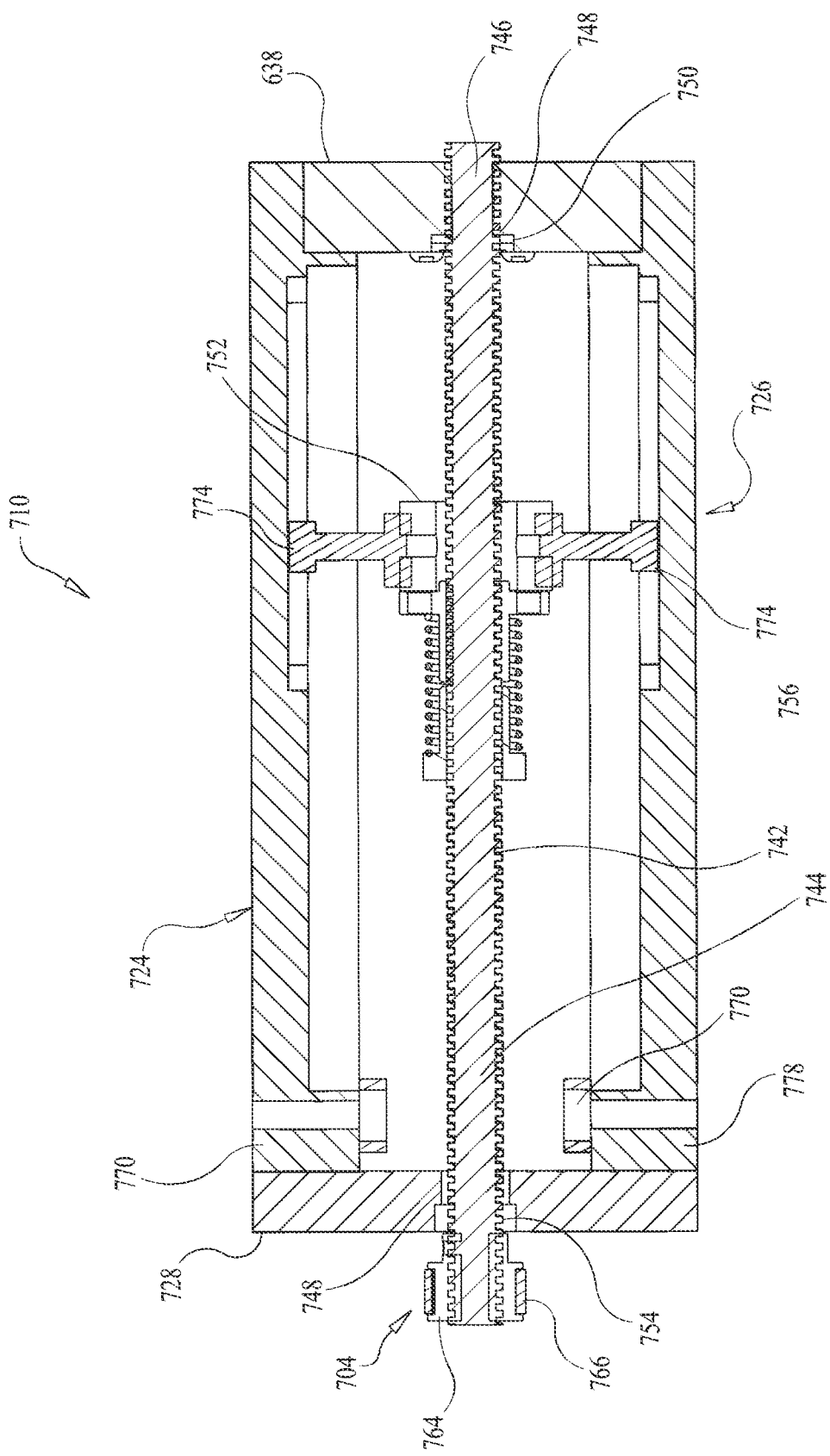
FIG. 18 presents a horizontal section view through the vertical adjustment assembly of FIG. 17.
Figure 19:
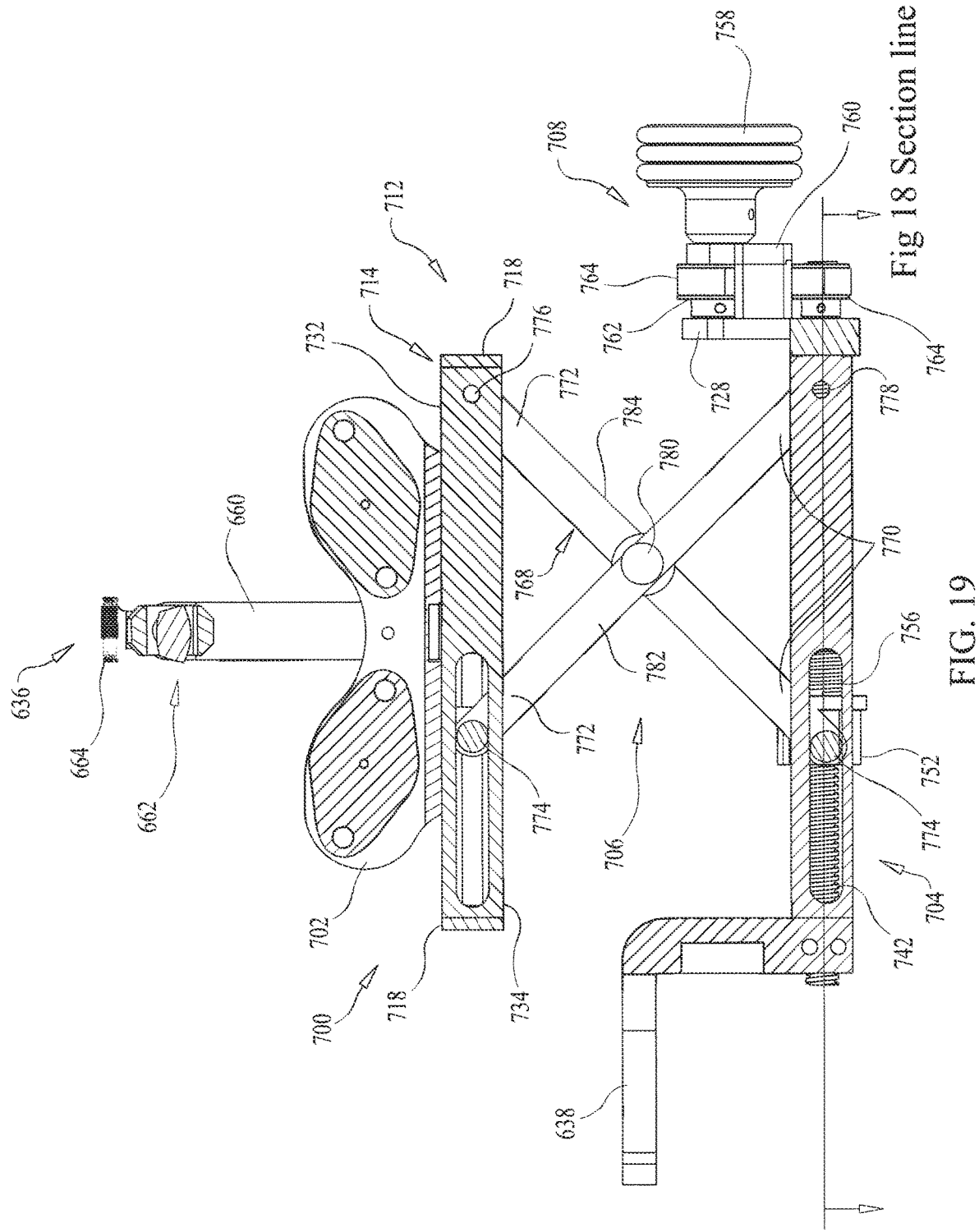
FIG. 19 presents a vertical section view through the vertical adjustment assembly of FIG. 17.

As shown in FIGS. 17 and 18, the primary lead screw 742 is mounted at a first end 744 through the annular front bushing bearing 754 secured in aperture 748 in the front base plate 728 and mounted at the second end 746 through the annular rear bushing bearing 750 secured in aperture 748 in the mounting bracket 638.

The actuator 708 includes an adjustment wheel 758, a front bracket 760, a main pulley 762, a transfer pulley 764, and a transfer belt 766. Front bracket 760 is coupled to the front end of the front base plate 728, and the main pulley 762 is disposed in-between. The distal end of the adjustment wheel 758 is coupled to the front end of the main pulley 762 and the rear end of the main pulley is rotatably mounted to the front end of the front base plate 728. The transfer pulley 764 is disposed adjacent to and directly below the main pulley 762 and is coupled to the first end 744 of the primary lead screw 742. The transfer belt 766 surrounds and connects the main pulley 762 with the transfer pulley 764. As such, as the user turns the adjustment wheel 758 to turn the main pulley 762, the main pulley will turn the transfer pulley 764, thus turning the primary lead screw 742. Although a belt and pulley transfer system are shown in the drawings for this aspect, the transfer system may be any suitable transfer system such as, for example, gears.

The scissor link assembly 706 includes a pair of spaced apart link sets 768 (each having a first (bottom) end 770 and a second (top) end 772, a pair of guide bearings 774 rotatably mounted to each link set, a pair of link head mounts 776, a pair of link base mounts 778, and a central brace 780. The central brace 780 is coupled at the center in-between the pair of link sets 768. Each link set 768 includes an exterior bar 782 rotatably mounted at the center to an interior bar 784. The first (bottom) end 770 of each exterior bar 782 is rotatably coupled on the exterior side to the corresponding link base mount 778, which is coupled to the exterior side of the corresponding first base guideway 724 or second base guideway 726. The second (top) end 772 of each exterior bar 782 is rotatably coupled on the exterior side to the corresponding guide bearing 774, which is disposed within the corresponding first (left) head guideway 714 or the second (right) head guideway 716, and when under load, the guide bearing may engage with the head bottom member 734 as it moves along in the horizontal x direction. The second (top) end 772 of each interior bar 784 is rotatably coupled on the exterior side to the corresponding link head mount 776, which is coupled to the exterior side of the corresponding first head guideway 714 or second head guideway 716. The first (bottom) end 770 of each interior bar 784 is rotatably coupled on the exterior side to the corresponding guide bearing 774, which is disposed within the corresponding first (left) base guideway 724 or the second (right) base guideway 726, and when under load, the guide bearing may engage with the base bottom member 738 as it moves along in the horizontal x direction. The screw bracket 752 is rotatably coupled on each side to the corresponding interior side of the first (bottom) end 770 of each interior bar 784. As such, the translation of the screw bracket 752 along the primary lead screw 742 causes movement of each interior bar 784, which causes extension and contraction of the link sets 768 of scissor link assembly 706 in the vertical direction z.

The upper portion 606 of the second support assembly 614 includes free rollers 618 and their associated mountings and supports, wheel mount bracket 702, head frame 712, and the pair of guide bearings 774 within the head frame. The height of the upper portion 606 of the second support assembly 614 is adjusted in the vertical direction z, by operation of the actuator 708 of the vertical adjustment assembly 700. The adjustment wheel 758 is provided to facilitate rotating the primary lead screw 742 to vertically adjust the height of the upper portion 606 of the second support assembly 614, including the free rollers 618, vertically with respect to the frame assembly 610.

Figure 12:
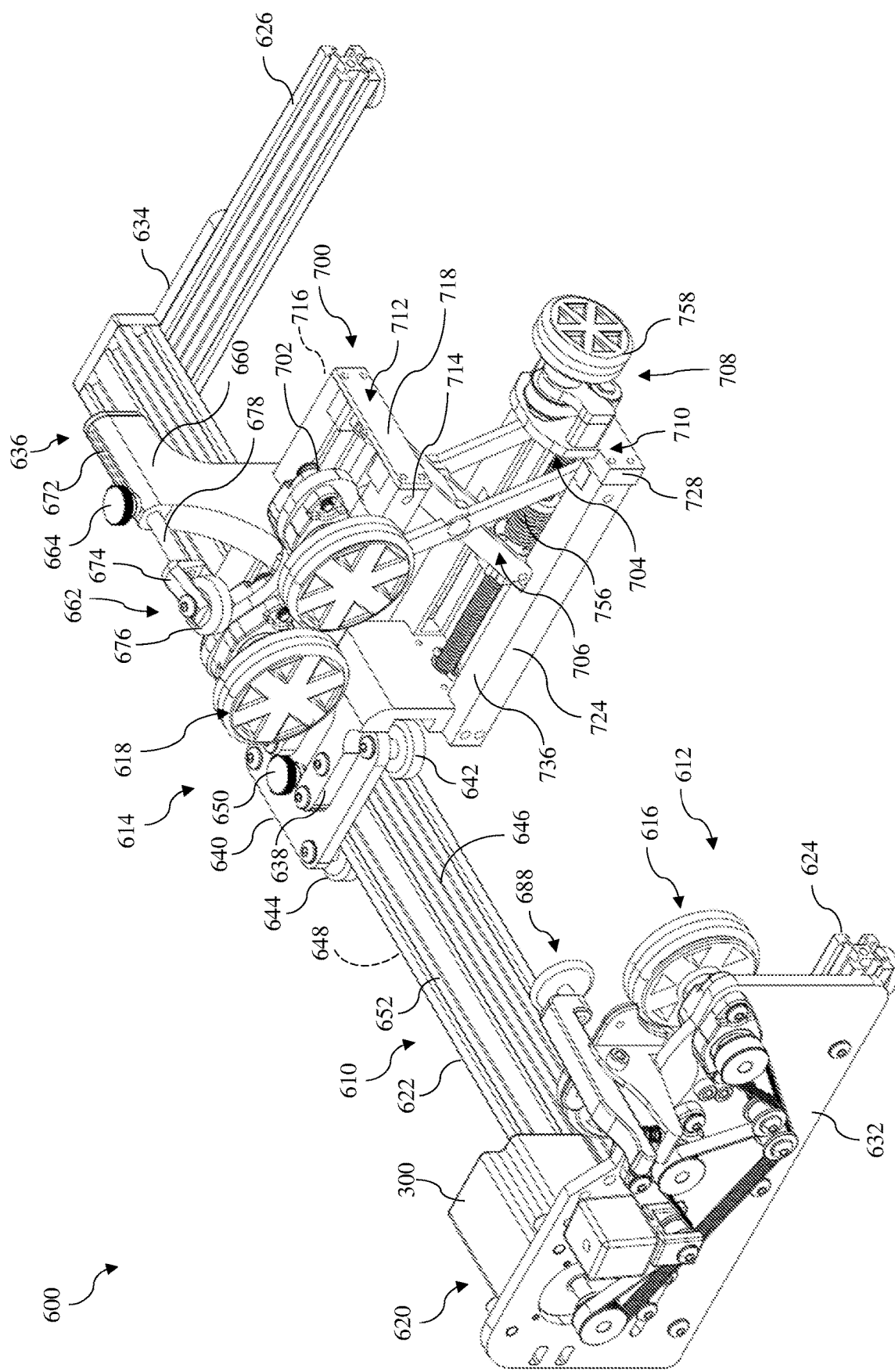
FIG. 12 presents a top, front left perspective view, similar to FIG. 11, of the rotary laser engraving device with the second support assembly adjusted fully vertically extended relative to the first support assembly.

The rear wheel stop 636 is normally in use for engraving certain items such as tumblers, long glasses and wine bottles, but may be removed to allow for longer items where their rear portion needs to extend to the right of the free rollers. As shown in FIG. 12, the maximum height "Hmax" to the top of the free rollers 618 of the rotary laser engraving device 600 is the distance to the top of the free rollers when the upper portion 606 of the second support assembly 614 is in its maximum height extension position. The maximum height Hmax is in the range of about 6.5 inches to about 7 inches, which provides a lower vertical profile engraving device compared to the higher vertical profile engraving device with first/stationary support post 128 and second/movable support post 130 of the first embodiment.

There are some laser machines with smaller laser heads and certain engraving applications which are better suited to utilizing rotary laser engraving devices with low-profile vertical height adjustment assemblies. In such cases, use of low-profile vertical adjustment assemblies allows proper positioning of objects in the engraving devices while maintaining extra clearance above the device. The extra clearance above the device protects against possible interference with the laser head or gantry of the laser machine. The vertical adjustment assembly 700 is disposed such that the top of the head frame 712 is below the center axes of the free rollers 618, thus providing a low-profile, compact design. There are no vertical support posts or any parts of the vertical adjustment assembly 700, (including the wheel mount bracket 702), that extend/protrude vertically above the top of the set of free rollers 618, thus providing an unobstructed pass through by the laser head.

Figure 13:
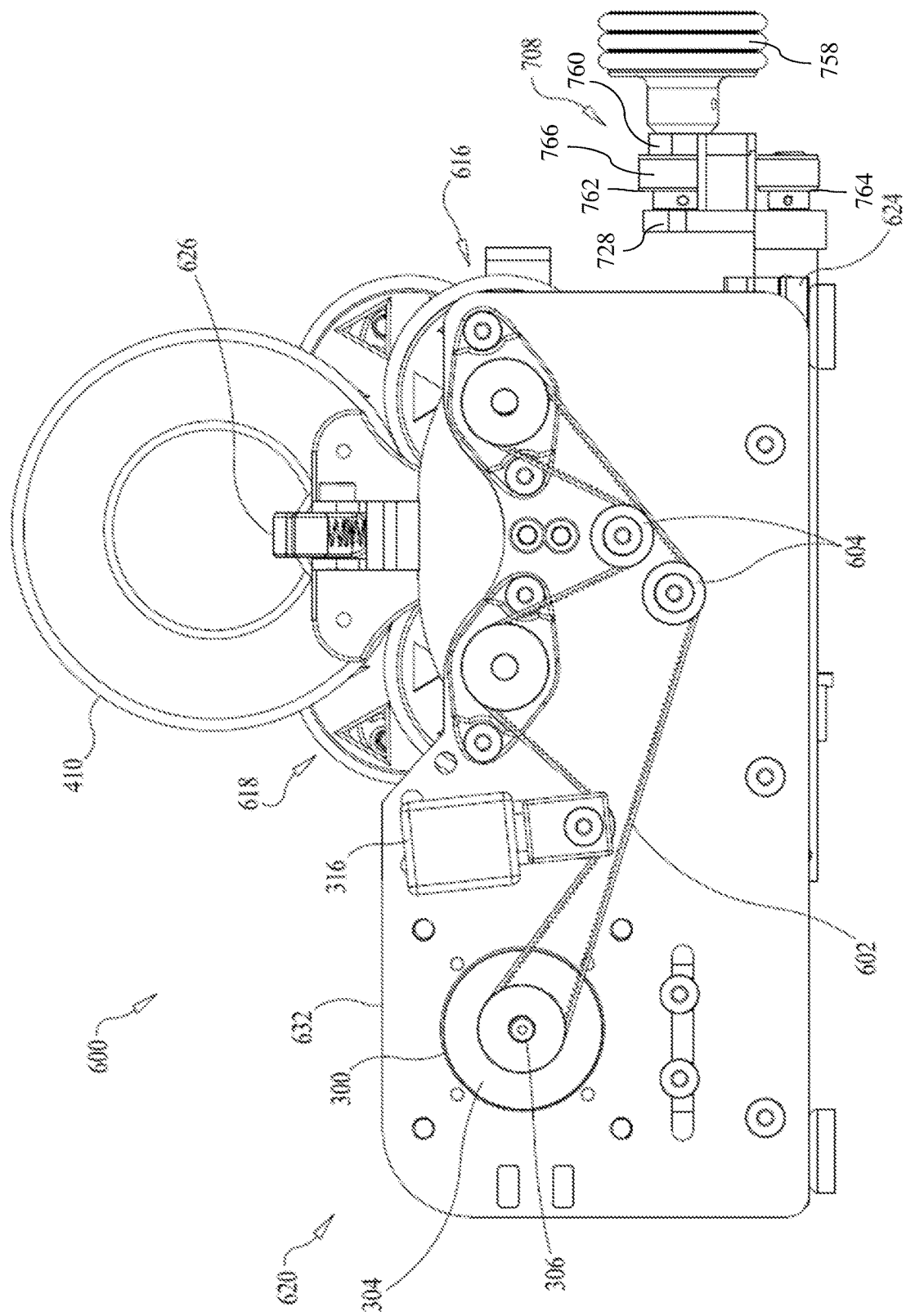
FIG. 13 presents a left side elevation view of the rotary laser engraving device of FIG. 10, illustrating a motor (drive) assembly associated with the first support assembly.

Referring now to FIG. 13, as noted hereinabove, in order to rotate the set of driven rollers 616, and thus rotate the object to be engraved, for example, tumbler 410, the rotary laser engraving device 600 includes the motor assembly 620. The motor assembly 620 of this second embodiment generally includes the motor 300 (see FIG. 9), a drive belt 602, drivingly connecting the motor 300 to the set of driven rollers 616. Specifically, in some aspects, the motor assembly 620 may include the motor drive pulley 304 mounted on the drive axle 306 of the motor 300, and parts similar to the first embodiment: cog pulleys, axles, driven rollers, and mounting brackets; and may further include one or more idler pulleys 604. The tensioner 316 is provided and is engageable with the drive belt 602 to tension the drive belt about the motor drive pulley 304 and the other pulleys as needed; in some embodiments, the tensioner 316 may be mounted to the first anchor plate 632. Thus, rotation of the motor 300 rotates the set of driven rollers 616 to thereby rotate the tumbler 410 as it is engraved by an associated laser engraving device (not shown).

Figure 15:
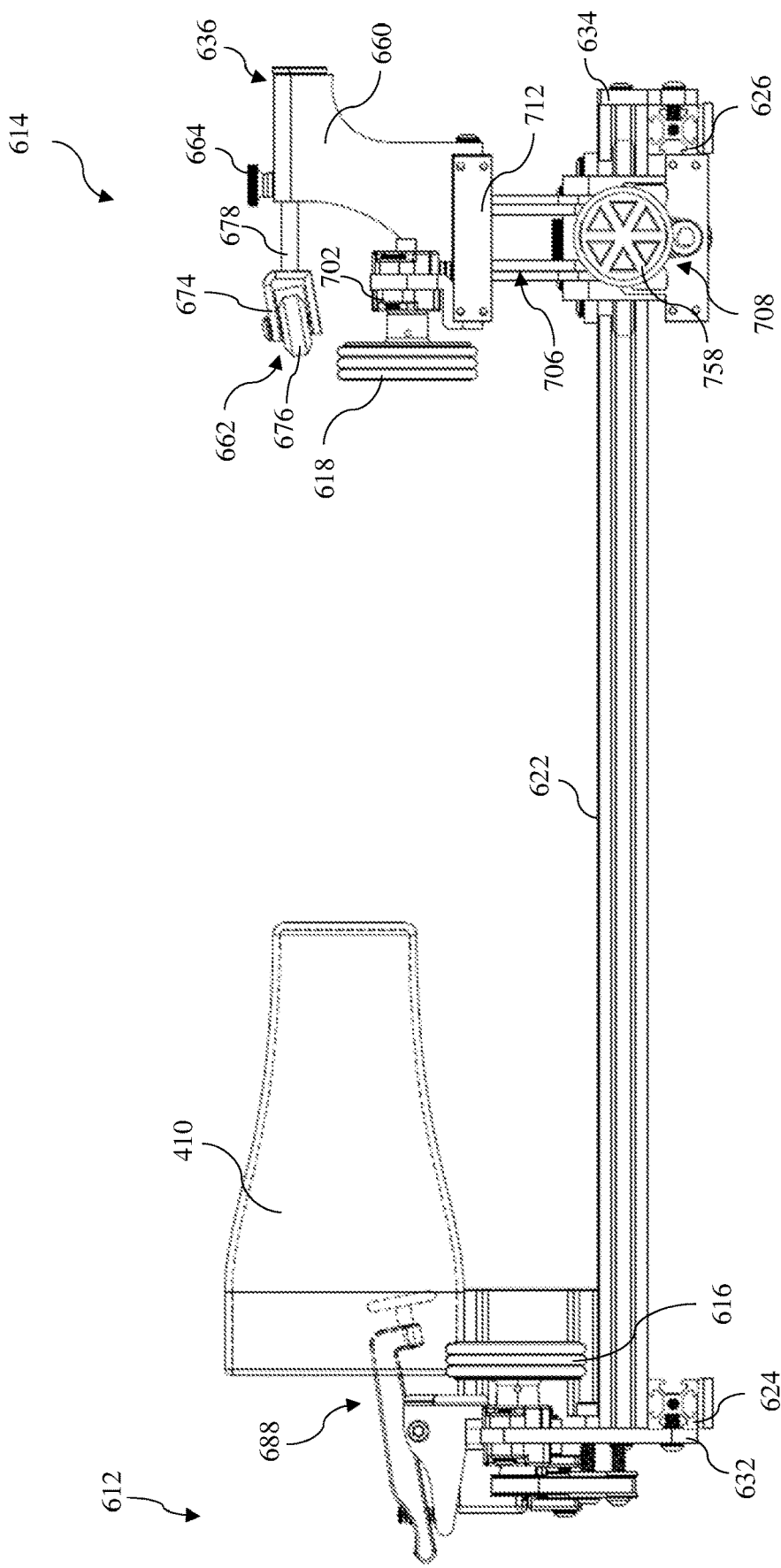
FIG. 15 presents a front elevation view of the rotary laser engraving device of FIG. 9, with a first end of the object to be engraved positioned on driven rollers of the first support assembly.

In operation, the use of the second support assembly 614 of the rotary laser engraving device 600 to mount and engrave an object, for example tumbler 410 (FIGS. 15, 16), is analogous to the first embodiment, as described above. The set of free rollers 618 of the second support assembly 614 are positioned at the desired elevation by the vertical adjustment assembly 700 to contact and support the rear end of the tumbler 410. Then the rear wheel stop 636 is adjusted via stop knob 664 to provide a longitudinal stop which contributes to prevent "walking" of the tumbler 410 as the item is rotated.

In other applications where the object to be engraved is particularly long (e.g., a baseball bat, not shown), the device operator or user may remove the rear wheel stop 636, to allow the rear portion of the object to extend beyond the set of free rollers 618. In this application with longer objects (not shown), the user may additionally remove the spring-loaded head clamp 688 from the first anchor plate 632 to provide alternative object mounting. Further, in cases where the cup or object is short in height (e.g., a dessert dish), it may be sufficiently supported only by the driven rollers 616 and the gripping mechanism (analogous to that shown in FIG. 15). In summary, the rotary laser engraving device 600 is configured to fully and firmly support a wide variety of objects as the object is rotated by the set of driven rollers 616.

Figure 16:
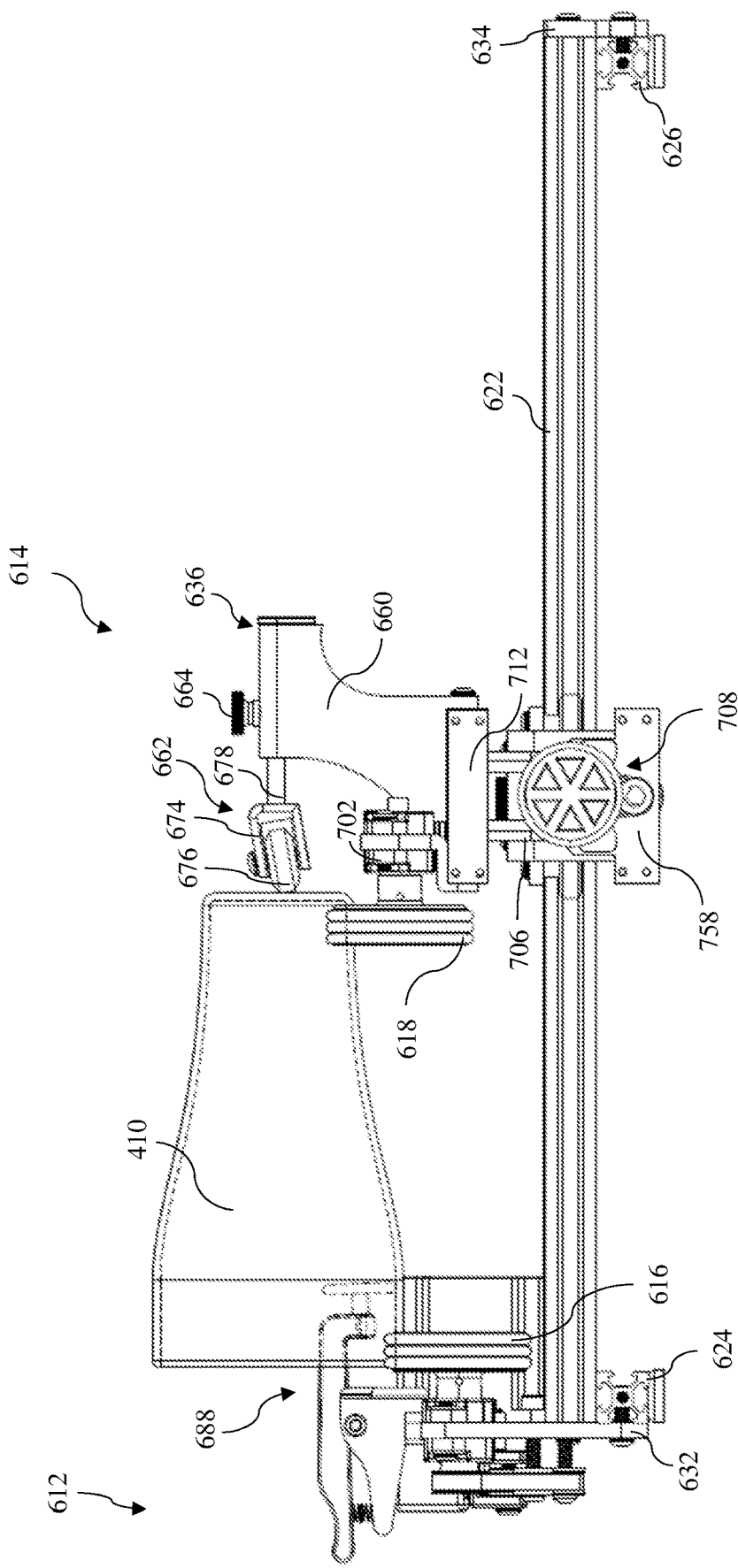
FIG. 16 presents a front elevation view of the rotary laser engraving device of FIG. 10 with the object to be engraved fully supported on the first and second support assemblies.

As seen in FIGS. 13, 16, once the tumbler 410 has been properly positioned and secured to the rotary laser engraving device 600, the motor 300 can be operated to rotate the drive belt 602 and thus rotate the set of driven rollers 616. Rotation of the set of driven rollers 616 rotates the tumbler 410 within the rotary laser engraving device 600 and about a central longitudinal axis of the tumbler, while the cup 400 remains rotatably clamped by the head clamp 688. Thereafter, a laser machine associated with the rotary laser engraving device 600 is actuated to project an engraving level laser beam 500 onto the tumbler 410 to engrave the desired images, logos, etc. into the tumbler.

Figure 20:
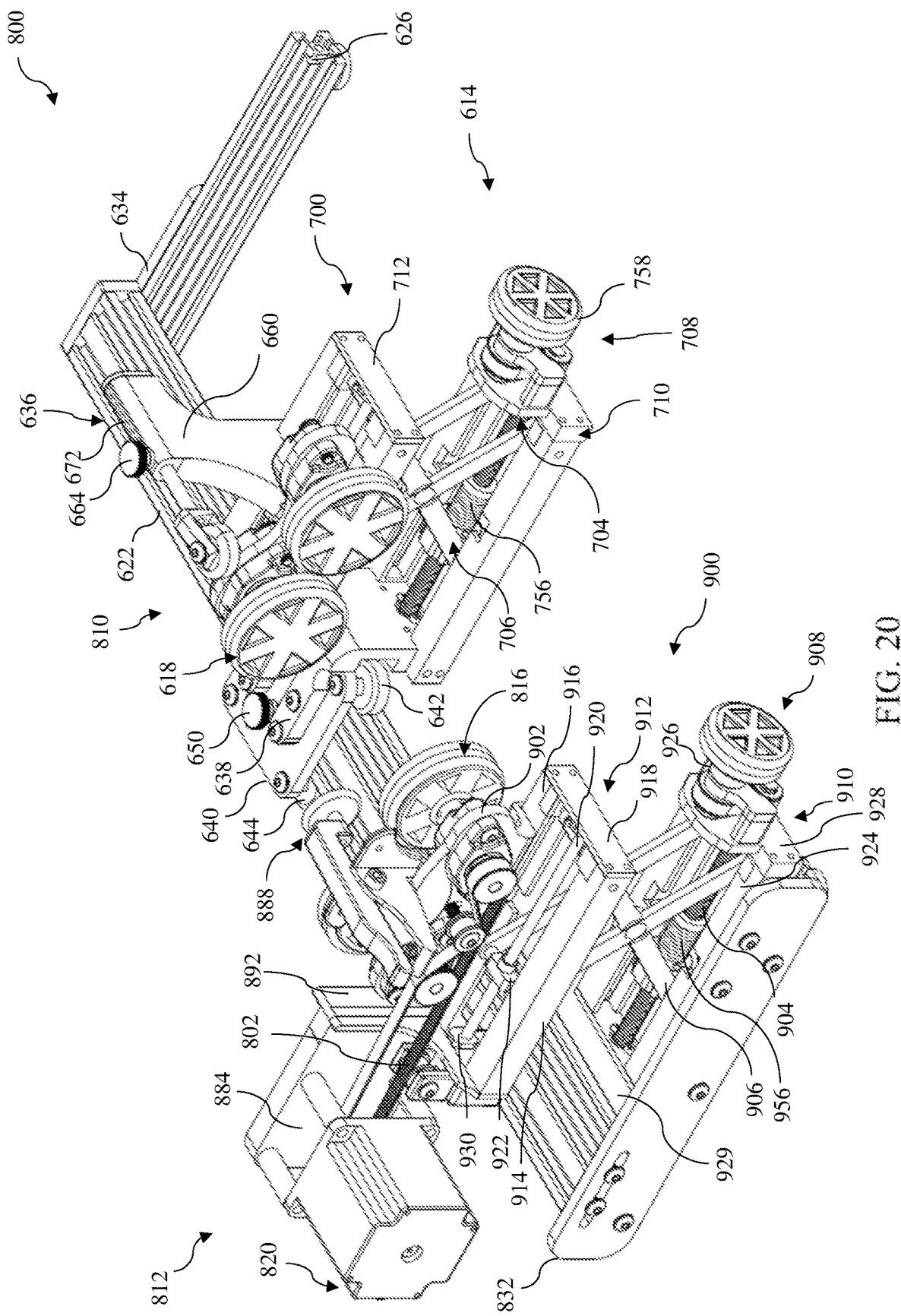
FIG. 20 presents a top, front left perspective view of a rotary laser engraving device in accordance with an illustrative third embodiment.
Figure 21:
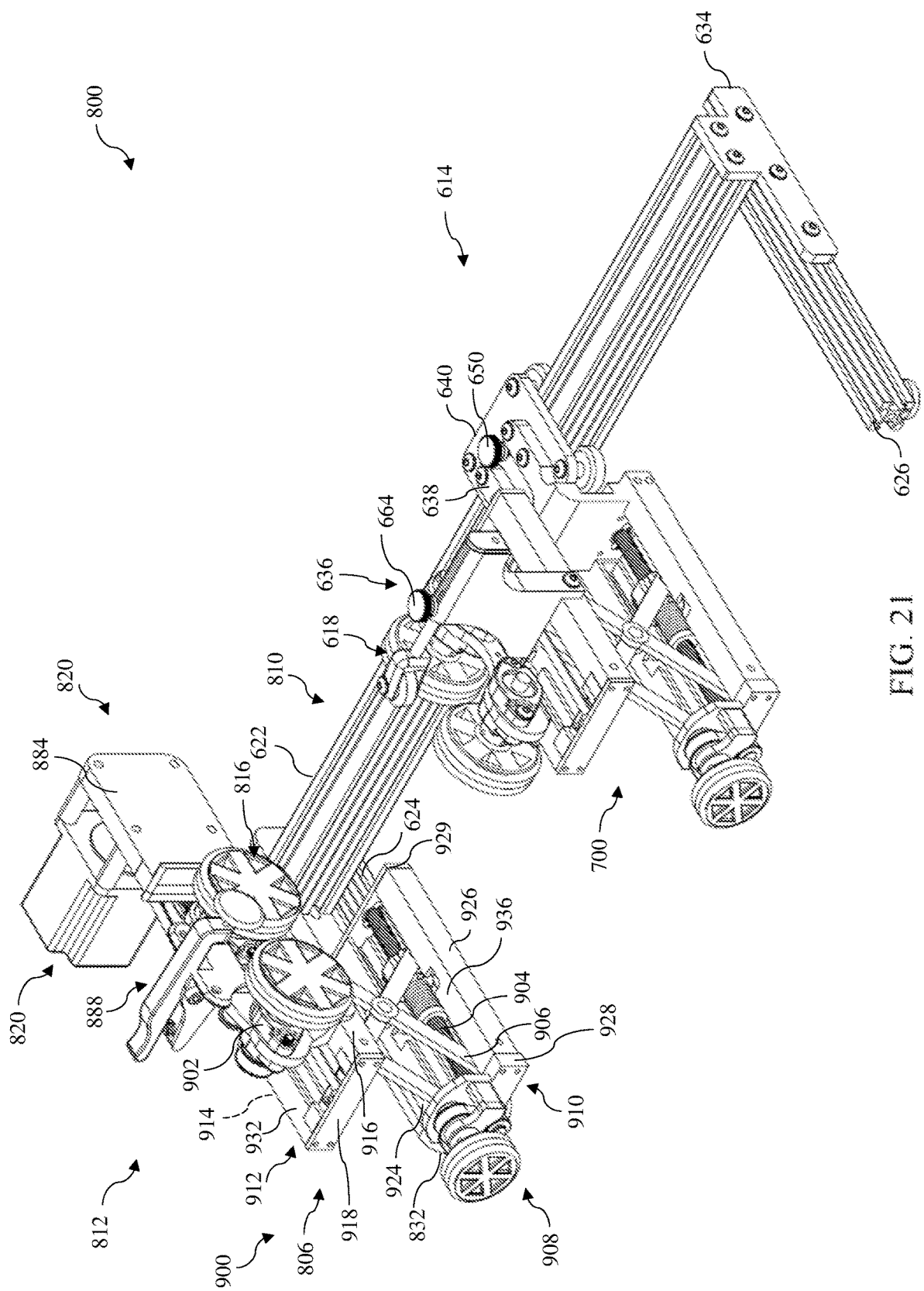
FIG. 21 presents a top, front right perspective view of the rotary laser engraving of FIG. 20.
Figure 22:
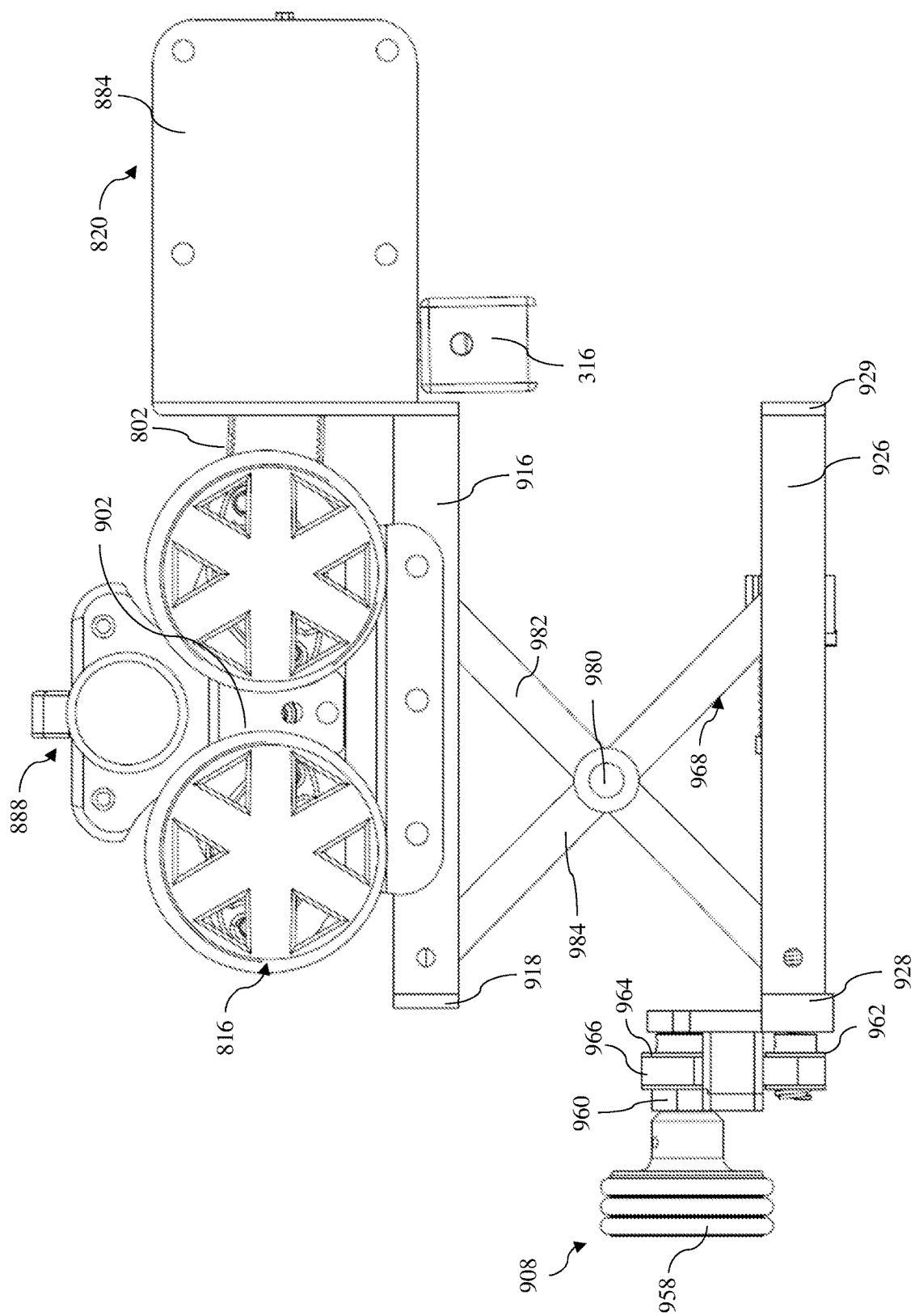
FIG. 22 presents a right side elevation view of the fixed vertical adjustment assembly of FIG. 20.
Figure 23:
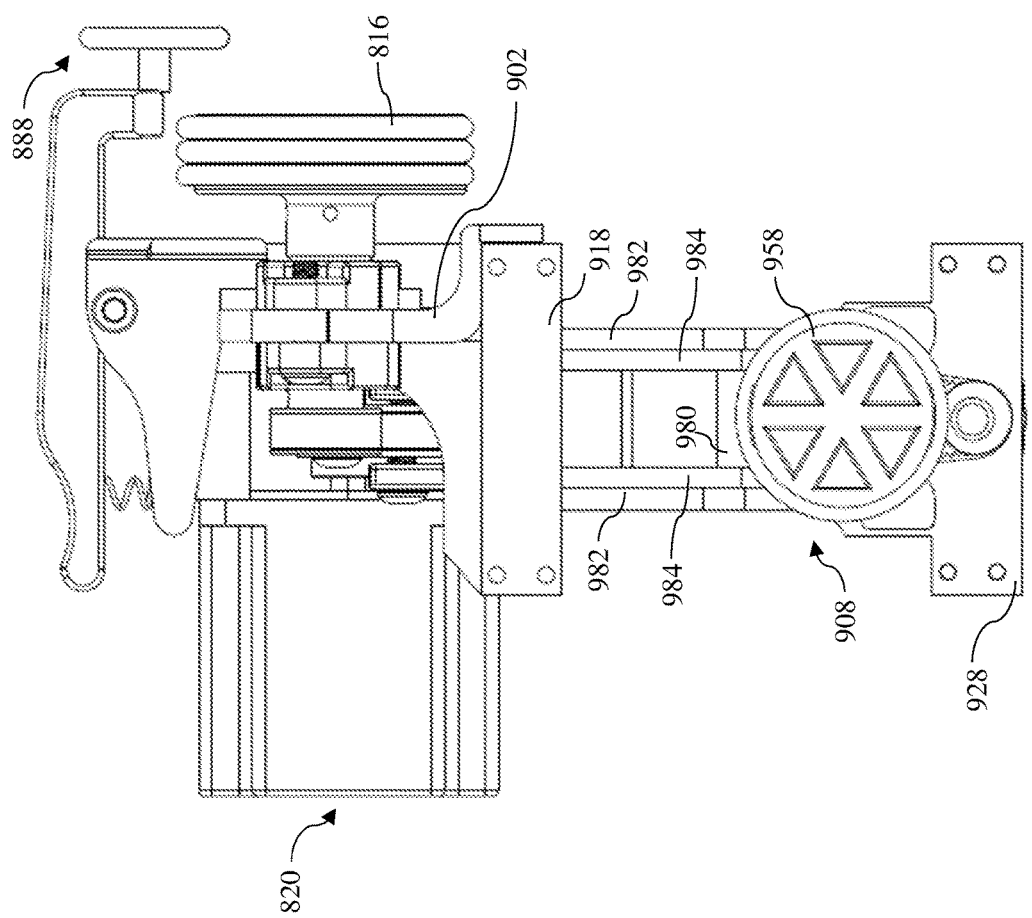
FIG. 23 presents a front side elevation view of the fixed vertical adjustment assembly of FIG. 22.

Referring initially to FIGS. 20 and 21, a rotary laser engraving device 800 is illustrated in accordance with an exemplary third embodiment. The rotary laser engraving device 800 generally includes a frame assembly 810, a first support assembly 812 mounted on the frame assembly 810 and a second support assembly 614 movably mounted on the frame assembly 810. The second support assembly 614 has the same structure and function as in the second embodiment described above. In the third embodiment, the upper portion 806 of the first support assembly 812 is movable relative to the frame assembly 810 in the vertical direction z in order to adjust for various sizes and/or diameters of the objects to be engraved. As in the second embodiment, the second support assembly 614 is movable relative to the frame assembly 810 in a horizontal, longitudinal direction y perpendicular to the vertical direction z, to accommodate varying lengths of objects to be engraved. The first support assembly 812 and the second support assembly 614 are off-centered from the frame assembly 810. More details are described hereinbelow.

As shown in FIGS. 20 and 21, similar to the second embodiment, the first support assembly 812 includes a set of driven rollers 816 for supporting and rotating a first (head) end or portion of an object to be engraved, while the second support assembly 614 includes the set of free rollers 618 to support a second (rear) end or portion of the object and allow the object to be engraved to rotate freely relative to the second support assembly. The free rollers 618 of the second support assembly 614 have the same structure, support, and relative orientation to each other as the second embodiment described above. A motor assembly 820 is provided to rotate the set of driven rollers 816 of the first support subassembly 812 and thus rotate the object to be engraved as it is being engraved by an associated laser mechanism (not shown). Although the layout shown in FIG. 20 locates the first support assembly with driven rollers as shown on the left and the second support assembly with free rollers as shown on the right, this arrangement may be mirrored about the x axis to be the opposite.

In order to support the first and second support assemblies 812 and 614, respectively, the frame assembly 810 generally includes a central rail or bar 622, which may be arranged in the longitudinal direction y. The central bar 622 may be affixed to the first transverse bar 624 and the second transverse bar 626, and the bars are the same as described in the second embodiment. The first and second transverse bars 624 and 626 may extend in a horizontal, transverse direction x that is perpendicular to the longitudinal direction y and vertical direction z. The first and second transverse bars 624 and 626 may stabilize the central bar 622, and thus the entire rotary laser engraving device 800, during operation of the motor assembly 820 and the engraving process.

The first support assembly 812 and the second support assembly 614 are offset from the central bar 622. The first transverse bar 624 is secured to the central bar 622 by a first anchor plate 832 and the second transverse bar 626 is secured to the central bar 622 by the second anchor plate 634 (FIG. 20). As described above for the second embodiment, in the third embodiment the second support assembly 614 generally includes the free rollers 618, the rear wheel stop 636, the mounting bracket 638, the glide plate 640, and the vertical adjustment assembly 700.

As described above for the second embodiment, in the third embodiment, the first support assembly 812 includes one or more retention features configured to retain the object to be engraved. The retention features may also include a gripping mechanism, such as at least one clamp. The gripping mechanism may be a spring-loaded head clamp 888, configured to abut against an inner surface of an object to be engraved, and bias the object against the set of driven rollers 816, while allowing it to rotate.

As can be seen in 20 and 21, the first support assembly 812 generally includes the driven rollers 816, a gripping mechanism, such as the spring-loaded head clamp 888, the motor assembly 820, a wheel mount bracket 902, motor support bracket 884, and a fixed vertical adjustment assembly 900. The fixed vertical adjustment assembly 900 is disposed to offset the driven rollers 816 horizontally forward from the front of central bar 622. The wheel mount bracket 902 mounts and supports the driven rollers 816, a front portion of the motor assembly 820 and the gripping mechanism, such as the spring-loaded head clamp 888 of the first support assembly 812.

The fixed vertical adjustment assembly 900 includes wheel mount bracket 902, a lead screw assembly 904, a scissor link assembly 906, an actuator 908, a base frame 910, and a head frame 912. Head frame 912 includes a first (left) head guideway 914, a second (right) head guideway 916 spaced apart from the first head guideway, a pair of opposing head plates 918, a center brace bar 920, and a center cross brace 922 slidingly mounted on the center brace bar. The front ends of the first head guideway 914 and second head guideway 916 are coupled to one of the head plates 918, and the rear ends of the first head guideway and second head guideway are coupled to the other of the head plates 918. The front end of the center brace bar 920 is coupled to an interior mount 930 on the (front) head plate 918 and the rear end of the center brace bar is coupled to an interior mount 930 on the (rear) head plate 918.

Base frame 910 includes a first (left) base guideway 924, a second (right) base guideway 926 spaced apart from the first base guideway, a front base plate 928, and a rear base plate 929, spaced apart from the front base plate. The front ends of the first base guideway 924 and second base guideway 926 are coupled to the front base plate 928, and the rear ends of the first base guideway and second base guideway are coupled to the rear base plate 929. The first (left) base guideway 924 is further coupled to the first anchor plate 832.

The first (left) head guideway 914 and the second (right) head guideway 916 each include a head top member 932 and a head bottom member 934 spaced apart from the head top member. The head bottom member 934 includes a stop cutout 940 disposed at a predetermined location. As described further below, the driven rollers 816 are coupled to wheel mount bracket 902 which is removably coupled to the second (right) head guideway 916 of head frame 912. The first (left) base guideway 924 and the second (right) base guideway 926 each include a base top member 936 and a base bottom member 938 spaced apart from the base top member. The base top member 936 includes a stop cutout 940 disposed at a predetermined location.

Again, as noted above, low-profile vertical height adjustment assemblies allow proper positioning of objects in the engraving devices while maintaining extra clearance above the device. The extra clearance above the device protects against possible interference with the laser head or gantry of the laser machine. The fixed vertical adjustment assembly 900 is disposed such that the top of the head frame 912 is below the center axes of the driven rollers 816, providing a low-profile, compact design.

Referring to 20 and 21, the driven rollers 816 of the first support assembly 812 have similar structure, support, and relative orientation to each other as the driven rollers 616 of the first support assembly 612 of the second embodiment described above. In the third embodiment the driven rollers 816 are coupled to wheel mount bracket 902 which is removably coupled to the second (right) head guideway 916. Similar to the first embodiment, the set of driven rollers 816 and the set of free rollers 618 are horizontally offset from the central longitudinal axis of the central bar 622, and additionally diagonally offset from the central bar 622. The offset is shown as both horizontal in the x direction and vertical in the z direction.

The lead screw assembly 904 includes a primary lead screw 942, (having a first end 944 and a second end 946), a rear bushing bearing 950, a screw bracket 952, a front bushing bearing 954, and a translational, internally-threaded anti-backlash nut or drive collar 956. The translational, yet non-rotational, drive collar 956, best shown in FIG. 26, is coupled to the screw bracket 952 and is threadingly mounted on the primary lead screw 942, such that rotation of the primary lead screw causes a translation of the drive collar and screw bracket back and forth along the primary lead screw, in the horizontal x direction, to cause extension and contraction of the scissor link assembly 906 and the head frame 912 in the vertical direction z.

Figure 26:
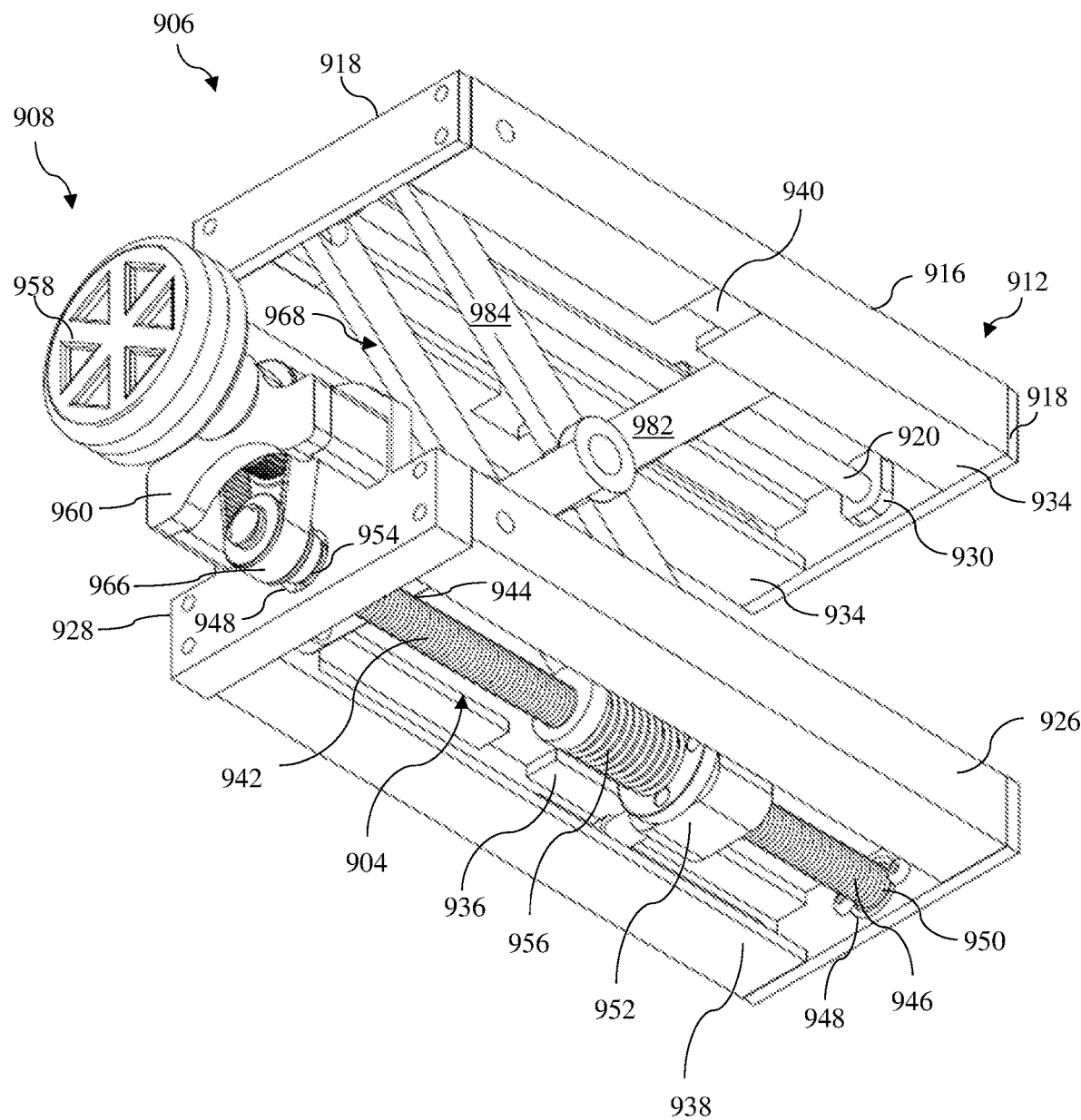
FIG. 26 presents a top, front right perspective view of the fixed vertical adjustment assembly of FIG. 22.
Figure 27:
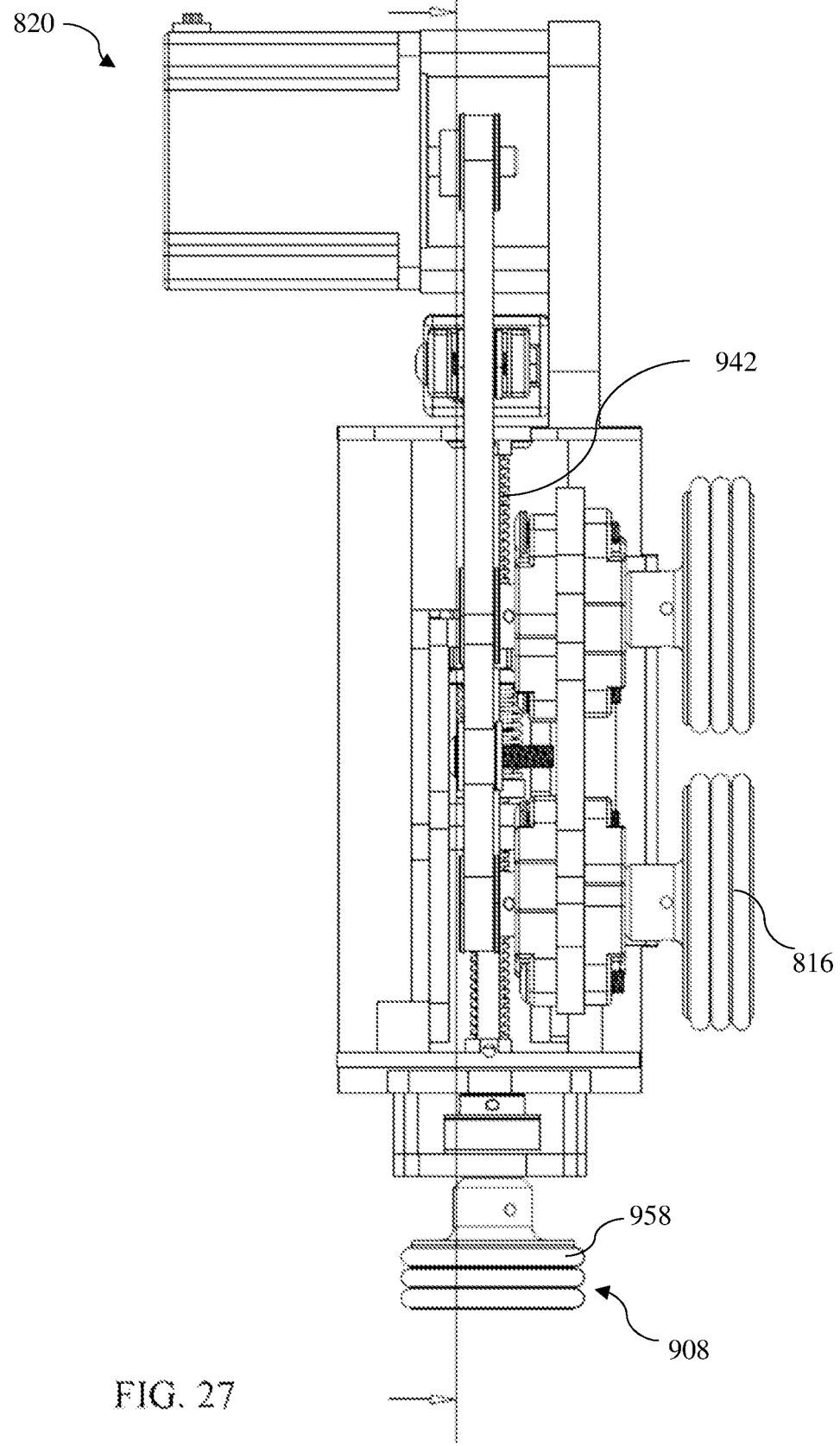
FIG. 27 presents a horizontal section view through the fixed vertical adjustment assembly of FIG. 26.
Figure 28:
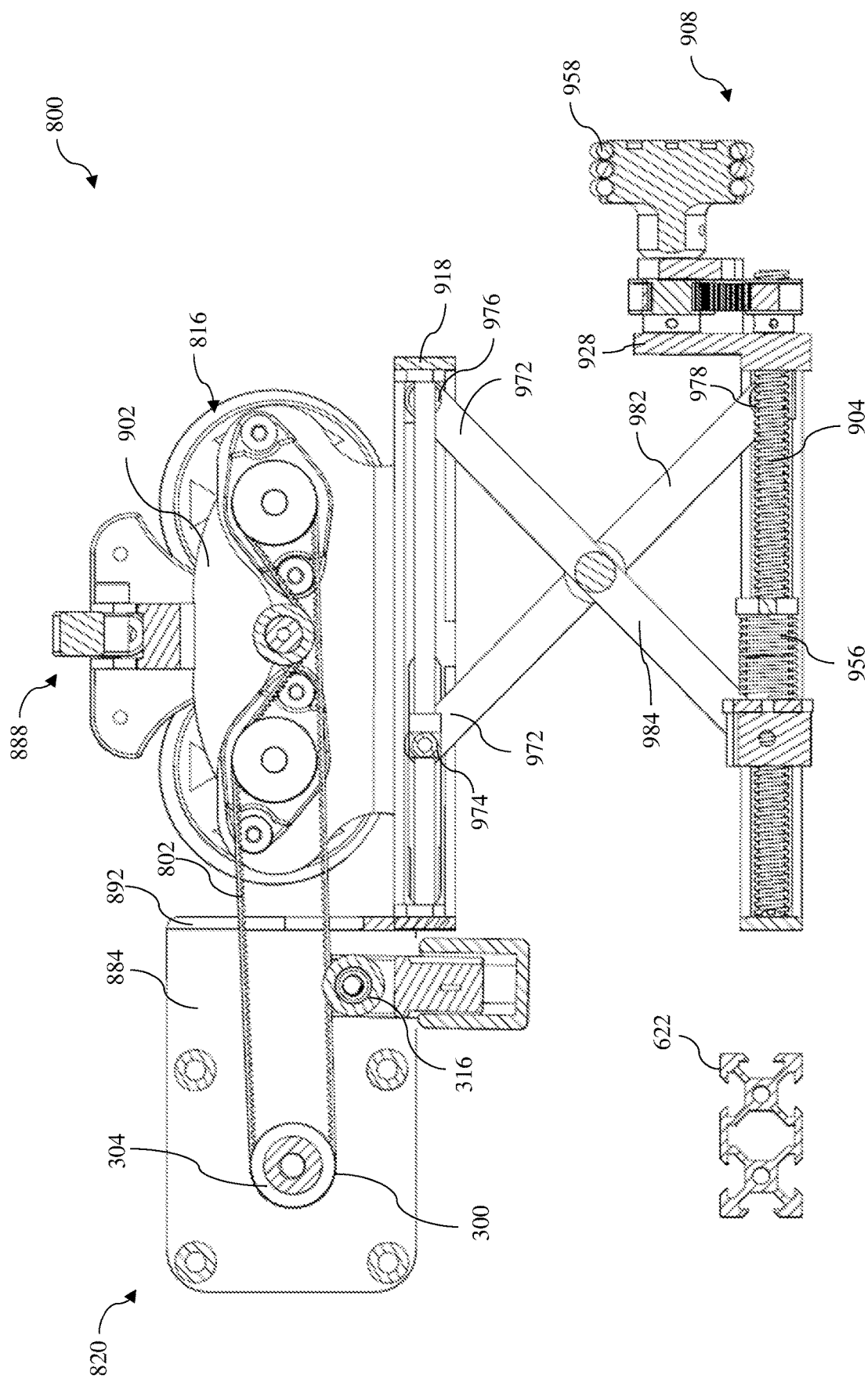
FIG. 28 presents a vertical section view through the fixed vertical adjustment assembly of FIG. 26.

As shown in FIGS. 26-27, the primary lead screw 942 is mounted at a first end 944 through the annular front bushing bearing 954 secured in aperture 948 in the front base plate 928 and mounted at the second end 946 through the annular rear bushing bearing 950 secured in aperture 948 in the rear base plate 929.

The actuator 908 includes an adjustment wheel 958, a front bracket 960, a main pulley 962, a transfer pulley 964, and a transfer belt 966. Front bracket 960 is coupled to the front end of the front base plate 928, and the main pulley 962 is disposed in-between. The distal end of the adjustment wheel 958 is coupled to the front end of the main pulley 962 and the rear end of the main pulley is rotatably mounted to the front end of the front base plate 928. The transfer pulley 964 is disposed adjacent to and directly below the main pulley 962 and is coupled to the first end 944 of the primary lead screw 942. The transfer belt 966 surrounds and connects the main pulley 962 with the transfer pulley 964. As such, as the user turns the adjustment wheel 958 to turn the main pulley 962, the main pulley will turn the transfer pulley 964, thus turning the primary lead screw 942. Although a belt and pulley transfer system is shown in the drawings for this aspect, the transfer system may be any suitable transfer system such as, for example, gears.

The scissor link assembly 906 includes a pair of spaced apart link sets 968 (each having a first (bottom) end 970 and a second (top) end 972, a pair of guide bearings 974 rotatably mounted to each link set, a pair of link head mounts 976, a pair of link base mounts 978, and a central brace 980. The central brace 980 is coupled at the center in-between the pair of link sets 968. Each link set 968 includes an exterior bar 982 rotatably mounted at the center to an interior bar 984. The first (bottom) end 970 of each exterior bar 982 is rotatably coupled on the exterior side to the corresponding link base mount 978, which is coupled to the exterior side of the corresponding first base guideway 924 or second base guideway 926. The second (top) end 972 of each exterior bar 982 is rotatably coupled on the exterior side to the corresponding guide bearing 974, which is disposed within the corresponding first (left) head guideway 914 or the second (right) head guideway 916, and when under load, the guide bearing may engage with the head bottom member 934 as it moves along in the horizontal x direction. The second (top) end 972 of each interior bar 984 is rotatably coupled on the exterior side to the corresponding link head mount 976, which is coupled to the exterior side of the corresponding first head guideway 914 or second head guideway 916. The first (bottom) end 970 of each interior bar 984 is rotatably coupled on the exterior side to the corresponding guide bearing 974, which is disposed within the corresponding first (left) base guideway 924 or the second (right) base guideway 926, and when under load, the guide bearing may engage with the base bottom member 938 as it moves along in the horizontal x direction. The screw bracket 952 is rotatably coupled on each side to the corresponding interior side of the first (bottom) end 970 of each interior bar 984. As such, the translation of the screw bracket 952 along the primary lead screw 942 causes movement of each interior bar 984, which causes extension and contraction of the link sets 968 of scissor link assembly 906 in the vertical direction z.

The upper portion 806 of the first support assembly 812 includes driven rollers 816 and their associated mountings and supports, wheel mount bracket 902, head frame 912, and the pair of guide bearings 974 within the head frame. The height of the upper portion 806 of the first support assembly 812 is adjusted in the vertical direction z, by operation of the actuator 908 of the fixed vertical adjustment assembly 900. The adjustment wheel 958 is provided to facilitate rotating the primary lead screw 942 to vertically adjust the height of the upper portion 806 of the first support assembly 812, including the driven rollers 816, vertically with respect to the frame assembly 810.

The maximum height "Hmax" to the top of the driven rollers 816 of the rotary laser engraving device 800 is the distance to the top of the driven rollers when the upper portion 806 of the first support assembly 812 is in its maximum height extension position. The maximum height Hmax is in the range of about 8.75 inches to about 9.0 inches, which provides a lower vertical profile engraving device compared to the higher vertical profile engraving device with first/stationary support post 128 and second/movable support post 130 of the first embodiment.

There are some laser machines with smaller laser heads and certain engraving applications which are better suited to utilizing rotary laser engraving devices with low-profile vertical height adjustment assemblies. In such cases, use of low-profile vertical adjustment assemblies allows proper positioning of objects in the engraving devices while maintaining extra clearance above the device. The extra clearance above the device protects against possible interference with the laser head or gantry of the laser machine. The fixed vertical adjustment assembly 900 is disposed such that the top of the head frame 912 is below the center axes of the driven rollers 816, thus providing a low-profile, compact design. There are no vertical support posts or any parts of the fixed vertical adjustment assembly 900 (including the wheel mount bracket 902), or of the motor assembly 820 that extend/protrude vertically above the top of the set of driven rollers 816, thus providing an unobstructed pass through by the laser head.

Figure 24:
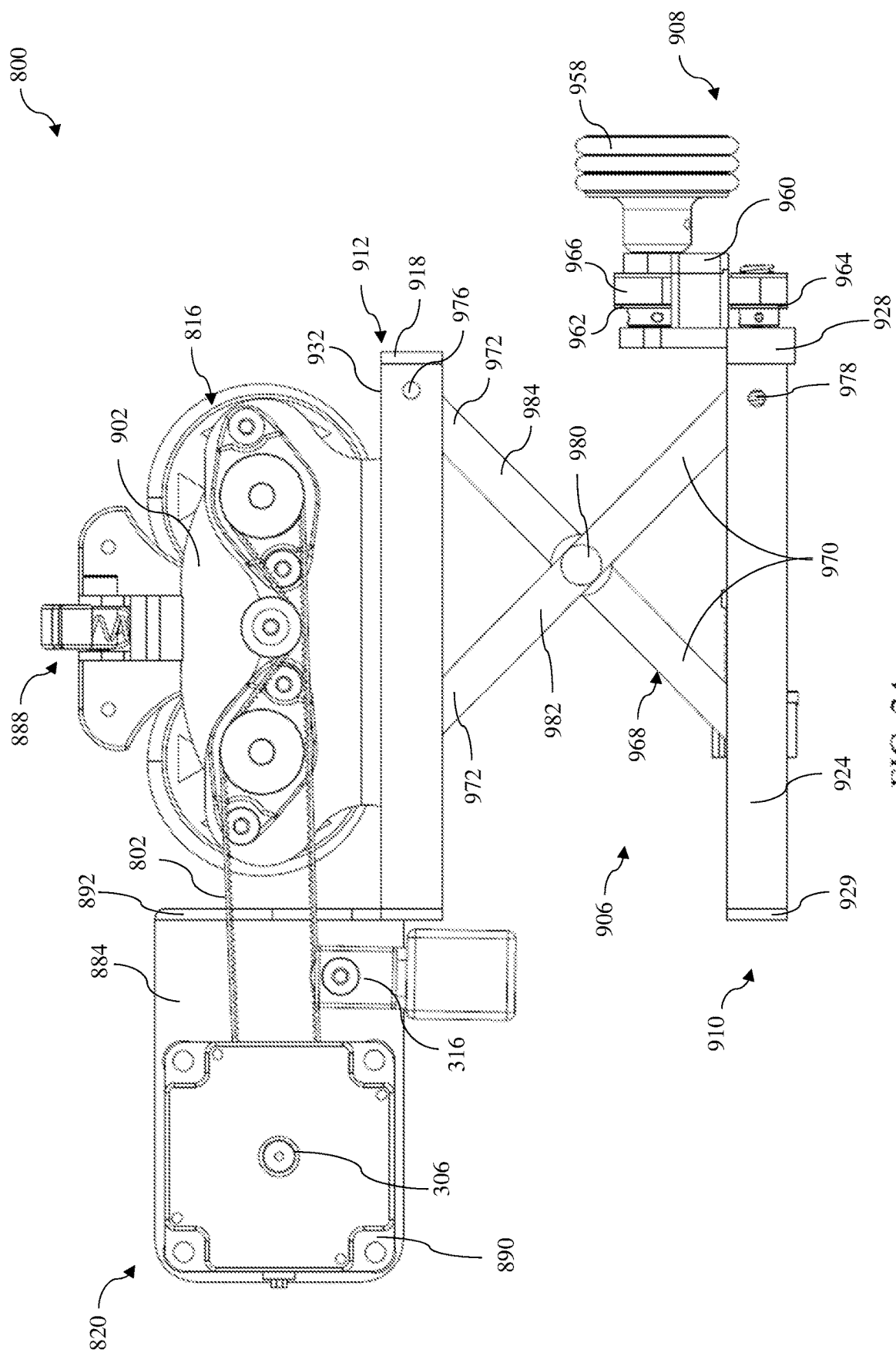
FIG. 24 presents a left side elevation view of the fixed vertical adjustment assembly of FIG. 22.
Figure 25:
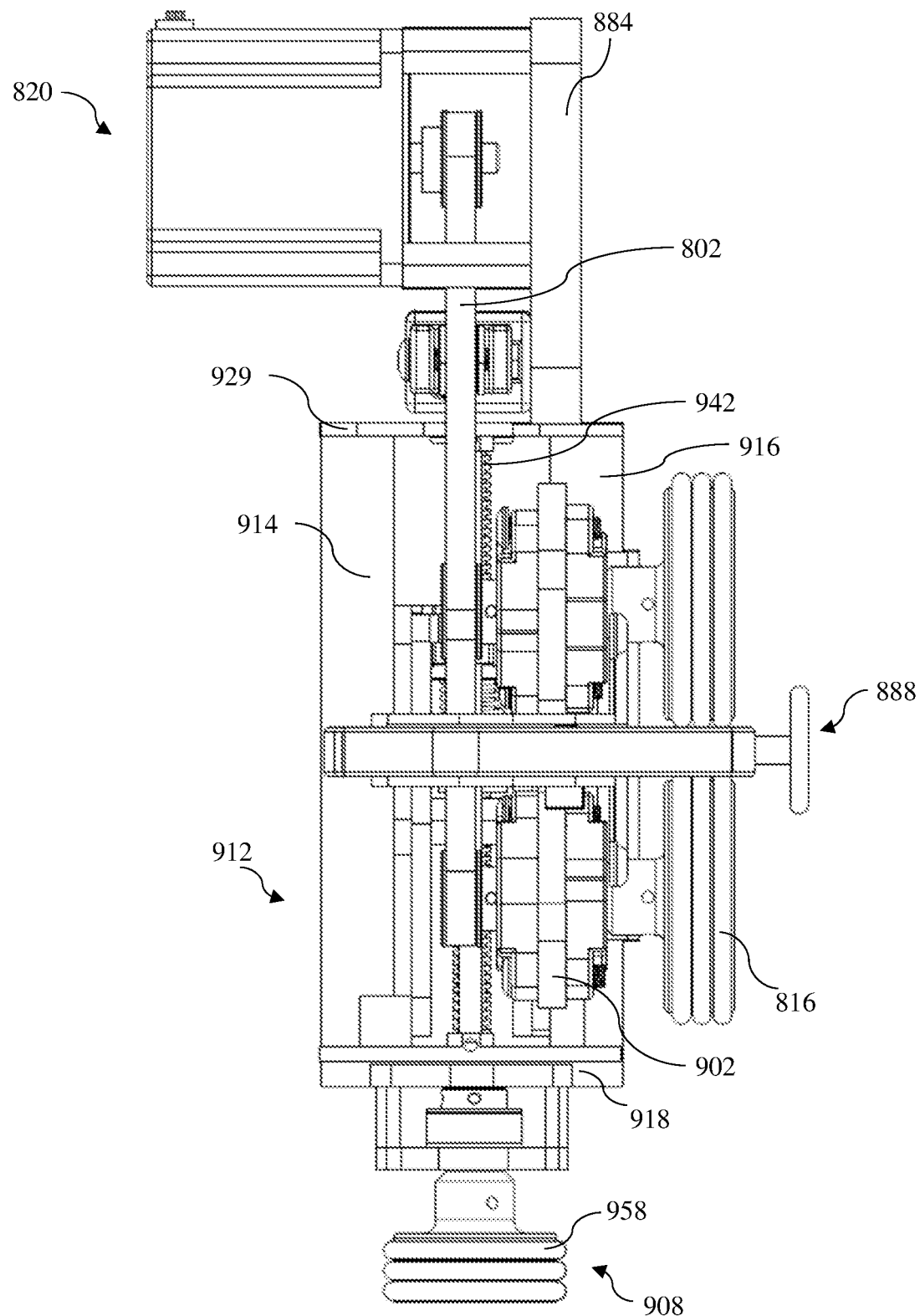
FIG. 25 presents a top view of the fixed vertical adjustment assembly of FIG. 22.

Referring now to FIG. 24, as noted hereinabove, in order to rotate the set of driven rollers 816, and thus rotate the object to be engraved, for example, tumbler 410, the rotary laser engraving device 800 includes the motor assembly 820. The motor assembly 820 of this third embodiment generally includes the motor 300, a drive belt 802, drivingly connecting the motor 300 to the set of driven rollers 816. Specifically, in some aspects, the motor assembly 820 may include the motor drive pulley 304 mounted on the drive axle 306 of the motor 300, and parts similar to the first embodiment: cog pulleys, axles, driven rollers, and mounting brackets; and may further include one or more idler pulleys 804. In the third embodiment, the motor 300 is coupled to a motor mount plate 890 of the motor support bracket 884. The motor support bracket 884 also includes an extension plate 892, extending perpendicular from the motor mount plate 890. The extension plate 892 is coupled to the rear head plate 918 of the head frame 912 of the fixed vertical adjustment assembly 900. The tensioner 316 is provided and is engageable with the drive belt 802 to tension the drive belt about the motor drive pulley 304 and the other pulleys as needed; in some embodiments, the tensioner 316 may be mounted to the motor support bracket 884. Thus, rotation of the motor 300 rotates the set of driven rollers 816 to thereby rotate the tumbler 410 as it is engraved by an associated laser engraving device (not shown).

In operation, the use of the second support assembly 614 of the rotary laser engraving device 800 to mount and engrave an object, for example tumbler 410 (FIG. 24), is analogous to the second embodiment, as described above. Further, the use of the fixed vertical adjustment assembly 900 is analogous to the use of the vertical adjustment assembly 700 as described above for the second embodiment, except that once the desired elevation of the set of driven rollers 816 is obtained, the front end of the tumbler 410 is engaged by head clamp 888, the motor assembly 820 is activated to rotate the set of driven rollers, thus rotating the tumbler, which is engraved by the laser (not shown).

The vertical adjustment assembly 700 and the fixed vertical adjustment assembly 900 are independently adjustable and are configured to vary the heights of the upper portion 806 of the first support assembly 812 and the upper portion 606 of second support assembly 614 in order to adjust for various sizes and/or diameters of the objects to be engraved.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A rotary laser engraving device for retaining and rotating an object to be engraved, the rotary laser engraving device comprising:
   a frame comprising a central bar arranged in a longitudinal direction, a first transverse bar and a second transverse bar arranged in a spaced-apart relationship and coupled to the central bar;
   wherein the first transverse bar has a centroidal axis parallel to the central bar;
   wherein the central bar is offset horizontally from the centroidal axis;
      a first support assembly mounted to the frame for supporting a first end of the object to be engraved;
      wherein the first support assembly includes a set of driven rollers engaged with a motor assembly to rotate the object to be engraved;
      wherein the first support assembly includes one or more retention features configured to retain the object to be engraved;
      a second support assembly slidably mounted to the central bar and including a set of free rollers for supporting a second end of the object to be engraved;
      wherein the set of driven rollers and the set of free rollers are offset diagonally from the central bar of the frame;
      wherein the second support assembly further comprises a glide plate carried by the frame and configured to slidably move the second support assembly in the longitudinal direction along the central bar to vary a longitudinal separation between the set of driven rollers and the set of free rollers;
      wherein the second support assembly further comprises a vertical adjustment assembly and a mounting bracket;
   wherein the mounting bracket being above the glide plate, and the mounting bracket adjacent to the vertical adjustment assembly;
   wherein the vertical adjustment assembly is coupled to the set of free rollers and is carried by the central bar of the frame; and
   wherein the vertical adjustment assembly is configured to move the set of free rollers in the vertical direction to vary a vertical separation between the set of driven rollers and the set of free rollers.

2. The device of claim 1, wherein the vertical adjustment assembly is disposed such that the top of the vertical adjustment assembly is below the top of the set of free rollers.

3. The device of claim 1, wherein the retention feature comprises at least one clamp configured to bias the object to be engraved against the set of driven rollers.

4. The device of claim 1, wherein the glide plate further comprises a position adjustment knob rotatably coupled to the glide plate and configured to selectively engage a longitudinally extending track formed in the central bar.

5. The device of claim 1, wherein the second support assembly further comprises a rear wheel stop removably coupled to the vertical adjustment assembly and configured for selectively retaining a rear end of the object to be engraved during rotation.

6. The device of claim 5, wherein the rear wheel stop further comprises a stop knob coupled to a bumper, whereby the bumper is positioned by the stop knob to bias against a rear end of the object and the stop knob configured to be tightened to set at a fixed horizontal position or to be left to ride on the bias tension.

7. The device of claim 1, wherein the motor assembly comprises a motor and a drive belt engageable with the motor, the drive belt engaging and rotating the set of driven rollers.

8. The device of claim 1, wherein the vertical adjustment assembly further comprises a scissor link assembly.

9. The device of claim 8, wherein the vertical adjustment assembly further comprises a wheel mount bracket, a lead screw assembly, an actuator, a base frame and a head frame; and wherein the set of driven rollers are coupled to the wheel mount bracket which is removably coupled to the head frame.

10. The device of claim 9, wherein the lead screw assembly further comprises a primary lead screw, a screw bracket, and an anti-backlash drive collar coupled to the screw bracket, whereby rotation of the primary lead screw causes a translation of the drive collar and the screw bracket back and forth along the primary lead screw, in the horizontal direction, to cause extension and contraction of the scissor link assembly and the head frame in the vertical direction.

11. The device of claim 10, wherein the actuator further comprises an adjustment wheel, a front bracket, a main pulley coupled to the adjustment wheel, a transfer pulley coupled to the primary lead screw, and a transfer belt which surrounds and connects the main pulley with the transfer pulley, whereby turning the adjustment wheel turns the primary lead screw.

12. The device of claim 10, wherein the scissor link assembly further comprises a pair of spaced apart link sets, a pair of wheels rotatably mounted to each link set, a pair of link head mounts, a pair of link base mounts, and a central brace coupled in-between the pair of link sets, wherein the screw bracket is rotatably coupled on each side to a bottom end of each link set, and the scissor link assembly is configured to vertically translate the head frame, the wheel mount bracket and the set of free rollers upon rotation of the primary lead screw.

13. A rotary laser engraving device for retaining and rotating an object to be engraved, the rotary laser engraving device comprising:
- a frame comprising a central bar arranged in a longitudinal direction, a first transverse bar and a second transverse bar arranged in a spaced-apart relationship and coupled to the central bar;
- wherein the first transverse bar has a centroidal axis parallel to the central bar;
- wherein the central bar is offset horizontally from the centroidal axis;
  - a first support assembly mounted to the frame for supporting a first end of the object to be engraved;
  - wherein the first support assembly includes a set of driven rollers engaged with a motor assembly to rotate the object to be engraved;
  - wherein the first support assembly includes one or more retention features configured to retain the object to be engraved;
  - a second support assembly slidably mounted to the central bar and including a set of free rollers for supporting a second end of the object to be engraved;
  - wherein the set of driven rollers and the set of free rollers are offset diagonally from the central bar of the frame;
  - wherein the second support assembly further comprises a glide plate carried by the frame and configured to slidably move the second support assembly in the longitudinal direction along the central bar to vary a longitudinal separation between the set of driven rollers and the set of free rollers;
  - wherein the second support assembly further comprises a vertical adjustment assembly and a mounting bracket;
- wherein the mounting bracket being above the glide plate, and the mounting bracket adjacent to the vertical adjustment assembly;
  - wherein the vertical adjustment assembly is coupled to the set of free rollers and is carried by the central bar of the frame;
  - wherein the vertical adjustment assembly is configured to move the set of free rollers in the vertical direction to vary a vertical separation between the set of driven rollers and the set of free rollers; and
  - wherein the vertical adjustment assembly comprises a scissor link assembly.

14. The device of claim 13, wherein the vertical adjustment assembly further comprises a wheel mount bracket, a lead screw assembly, an actuator, a base frame and a head frame; and wherein the set of driven rollers are coupled to the wheel mount bracket which is removably coupled to the head frame.

15. The device of claim 13, wherein the lead screw assembly further comprises a primary lead screw, a screw bracket, and an anti-backlash drive collar coupled to the screw bracket, whereby rotation of the primary lead screw causes a translation of the drive collar and the screw bracket back and forth along the primary lead screw, in the horizontal direction, to cause extension and contraction of the scissor link assembly and the head frame in the vertical direction.

16. The device of claim 13, wherein the actuator further comprises an adjustment wheel, a front bracket, a main pulley coupled to the adjustment wheel, a transfer pulley coupled to the primary lead screw, and a transfer belt which surrounds and connects the main pulley with the transfer pulley, whereby turning the adjustment wheel turns the primary lead screw.

17. The device of claim 13, wherein the scissor link assembly further comprises a pair of spaced apart link sets, a pair of wheels rotatably mounted to each link set, a pair of link head mounts, a pair of link base mounts, and a central brace coupled in-between the pair of link sets, wherein the screw bracket is rotatably coupled on each side to a bottom end of each link set, and the scissor link assembly is configured to vertically translate the head frame, the wheel mount bracket and the set of free rollers upon rotation of the primary lead screw.

18. The device of claim 13, wherein the vertical adjustment assembly is disposed such that the top of the vertical adjustment assembly is below the top of the set of free rollers.

19. The device of claim 13, wherein the second support assembly further comprises a rear wheel stop removably coupled to the vertical adjustment assembly and configured for selectively retaining a rear end of the object to be engraved during rotation.

* * * * *